United States Patent
Nahum et al.

(10) Patent No.: US 6,664,535 B1
(45) Date of Patent: Dec. 16, 2003

(54) SCALE STRUCTURES AND METHODS USABLE IN AN ABSOLUTE POSITION TRANSDUCER

(75) Inventors: Michael Nahum, Kirkland, WA (US); Benjamin K. Jones, Seattle, WA (US); Avron M. Zwilling, Redmond, WA (US)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/195,422

(22) Filed: Jul. 16, 2002

(51) Int. Cl.[7] .................................................. G01D 5/34
(52) U.S. Cl. .................. 250/231.14; 250/566; 356/617
(58) Field of Search ............... 250/231.14, 231.13, 250/231.18, 237 G, 237 R, 566, 568, 569, 570; 356/617, 616, 614; 341/9, 13; 33/706, 707

(56) References Cited

U.S. PATENT DOCUMENTS

| | | | |
|---|---|---|---|
| 3,882,482 A | 5/1975 | Green et al. | |
| 4,631,519 A | 12/1986 | Johnston | |
| 5,279,044 A | 1/1994 | Bremer | |
| 5,874,729 A | * 2/1999 | Holzapfel | 250/231.16 |
| 5,886,519 A | 3/1999 | Masreliez et al. | |
| 5,894,678 A | * 4/1999 | Masreliez et al. | 33/762 |
| 5,965,879 A | 10/1999 | Leviton | |
| 6,472,658 B2 | * 10/2002 | Mayer et al. | 250/237 G |

* cited by examiner

Primary Examiner—Kevin Pyo
Assistant Examiner—Seung C. Sohn
(74) Attorney, Agent, or Firm—Oliff & Berridge, PLC

(57) ABSTRACT

An absolute position-sensing device is usable to measure the relative position of two elements. An absolute scale includes an integrated track extending along a measuring axis of the scale. The integrated track includes a plurality of periodic portions interleaved with a plurality of non-periodic portions. Each periodic portion includes a plurality of periodically-placed scale elements. Each non-periodic portion includes a plurality of code elements indicative of an absolute measurement value. The code elements may have a length that is narrower along the measuring axis than the length of the periodic scale elements. The offset of the periodic-placed elements relative to a readhead of the device is combined with the absolute measurement value to determine an absolute position.

35 Claims, 9 Drawing Sheets

SCALE STRUCTURES AND METHODS USABLE IN AN ABSOLUTE POSITION TRANSDUCER

BACKGROUND OF THE INVENTION

1. Field of Invention

This invention relates to an absolute position optical displacement-sensing device.

2. Description of Related Art

Absolute position encoders use a scale structure-that allows the position of a readhead relative to a scale to be determined without requiring any reference to a given starting point along the,scale. A variety of absolute position encoders are known which use multiples information tracks along the scale.

In many conventional capacitive and inductive absolute position encoders, the scale structures include two or more tracks that have different periodic spatial wavelengths that, in combination, uniquely identify the position of the readhead relative to the scale within a limited distance. U.S. Pat. No. 5,886,519 discloses one embodiment of such an inductive absolute position encoder.

The 519 patent also discloses an embodiment that includes a track having a periodic spatial layout of the sensible elements and a separate, code, track that includes a series of sensible elements that are arranged in a pseudo-random sequence. In particular, for any subset of the sensible elements of this code track that are located within the bounds of the readhead sensor elements, the sensible elements form a unique binary, trinary or higher-modulus code word that uniquely identifies the position of the readhead relative to the scale to a first resolution, while the track having a periodic spatial layout identifies the position of the readhead relative to the scale to a finer resolution.

Similarly, many conventional optical position encoders use multiple information tracks along the scale, where, for each "position" along the scale, a code track, or a combination of code tracks, defines a unique value that uniquely identifies that position along the scale. Often, methods are also used which determine the position of a periodic track relative to the readhead to a resolution that is smaller than the resolution provided by the one or more code tracks alone. U.S. Pat. Nos. 3,882,482, 5,965,879 and 5,279,044, incorporated herein by reference, disclose such multi-code-track optical encoders.

U.S. Pat. No. 4,631,519, as well as the 044 patent, disclose embodiments of optical absolute position encoders that integrate the previously mentioned code track functions and periodic track functions into a single combined track. In such embodiments, the code elements are arranged non-periodically along the track, but each individual code element is nevertheless positioned to align with an underlying continuous periodic grid.

SUMMARY OF THE INVENTION

The inventors of this invention have determined that the optical encoder configurations discussed above have a number of disadvantages. Multiple track disadvantages include requiring overly-large-sized readheads, overly-wide scales and poor "information density" in at least some of the tracks. Conversely, if multiple track configurations are made narrow, sensitivity to static and/or dynamic mounting misalignments and/or the need for more complicated readhead sensing or signal processing arises. Previous combined track optical encoder configurations also have a number of disadvantages. These disadvantages include limited scale lengths if high resolution is desired, relatively low resolution if a long scale length is desired, and/or the need for relatively more complicated readhead sensing or signal processing to achieve speeds, accuracies and resolution comparable to that achievable using a track of elements arranged periodically. Furthermore, it is relatively expensive to fabricate scales having code element sequences that are everywhere unique along the scale but which must nevertheless be precisely aligned with an underlying continuous periodic grid in order to provide accurate and high-resolution absolute measurements. An optical absolute position encoder that could avoid any one or more of these disadvantages would be useful.

This invention provides optical absolute position encoders that have relatively small readhead sizes and/or relatively narrow scale widths.

This invention further provides optical absolute position encoders that reduce the size of the readhead and/or the width of the scale by using an integrated scale track that integrates both periodic and code structures.

This invention separately provides optical absolute position encoders that are relatively insensitive to static and dynamic misalignments of the scale in a direction transverse to the measuring axis.

This invention separately provides optical absolute position encoders that have both long scale lengths and high resolution.

This invention further provides optical absolute position encoders that obtain long scale lengths and high resolution by using an integrated scale track that includes a code portion that allows for long scale lengths and a periodic portion that allows for high-resolution determinations of the relative position between the readhead and the scale.

This invention separately provides a scale for optical absolute position encoders that has an integrated scale track that includes both a code portion and a periodic portion.

This invention further provides a scale that has an integrated scale track where the code portion and the periodic portion occur alternately along the length of the scale.

This invention additionally provides a scale track where the code portions and the periodic portions that occur alternately along the scale are adjacent to one another.

This invention separately provides methods for determining the absolute position of a readhead of an optical absolute position encoder relative to a scale of the optical absolute position encoder from an image of an integrated scale track that includes both non-periodic code portions and periodic portions.

This invention further provides methods for determining the absolute position of the readhead relative to the scale by locating a code portion appearing within an image of the scale and determining a first-resolution relative position based on the code appearing in the located code portion.

This invention additionally provides methods for determining the absolute position of the readhead relative to the scale by locating a predetermined portion appearing within the image of the scale and determining a second-resolution relative position based on the location of the predetermined portion within the image of the scale.

This invention also provides methods for determining the absolute position of the readhead relative to the scale by determining an offset distance between a periodic portion appearing within the image and a periodic reference structure and determining a third-resolution relative position based on the offset distance.

In various exemplary embodiments of the scale according to this invention, the scale includes an integrated scale track extending along a measuring axis. The integrated scale track includes one or more periodic portions placed along the measuring axis, where each periodic portion has a plurality of periodic elements. The integrated scale track also includes non-periodic code portions, which are placed between the periodic portions. Each non-periodic code portion is a unique set or group of code elements and thus identifies a specific location along the scale. In various exemplary embodiments, each non-periodic code portion includes a predetermined portion that extends along the measuring axis. The predetermined portion may be a single element or space having predetermined characteristics, or a predetermined pattern of elements. In various other exemplary embodiments, a predetermined portion that extends along the measuring axis is provided on the scale adjacent to one end, or even both ends, of the non-periodic code portion. In any case, this predetermined portion allows the readhead signals arising from the code portions of the scale to be rapidly distinguished from the readhead signals arising from other portions of the scale.

In various other exemplary embodiments according to this invention, the periodic scale elements are placed along the scale to coincide with an underlying incremental pitch that is continuous and spatially synchronized between the periodic portions, even though the non-periodic code portions interrupt the continuity of the periodic elements along the measuring axis. In various other exemplary embodiments according to this invention, at least some of the individual code elements of the non-periodic code portions are narrower in a direction along the measuring axis than the periodic scale elements. In various other exemplary embodiments according to this invention, one set of the code elements may be spaced apart from an adjacent set of code elements up to a determined limit based on the dimensions of a detector array of the readhead and a magnification applied to the scale image by the readhead.

In various exemplary embodiments, each set of code elements in effect indicates the position or measurement value of a local datum feature to provide a coarse resolution absolute position value. The local datum feature is associated with a plurality of periodic scale elements. In various other exemplary embodiments according to this invention, a detector array of the readhead further determines the position of the local datum feature relative to the detector array to a higher resolution that is finer than the period of the periodic scale elements. In various other exemplary embodiments according to this invention, the detector array of the readhead further determines the position of at least some of the periodic scale elements relative to the detector array and/or the readhead to provide the highest resolution absolute position measurement. In various other exemplary embodiments according to this invention, the detector array pitch is chosen such that there are a plurality of detector elements for each periodic scale element imaged by the array. In various exemplary embodiments, the detector array pitch is chosen such that there are a plurality of detector elements for each code element imaged by the array.

In various exemplary embodiments of the absolute scale according to this invention, the sets of code elements form sequential code words along the scale. In various other exemplary embodiments according to this invention, the sequential code words directly indicate the corresponding position along the scale. In various other exemplary embodiments according to this invention, the sequential code words are converted to absolute position measurement values using a decoder look-up table.

These and other features and advantages of this invention are described in, or are apparent from, the following detailed description of various exemplary embodiments of the systems and methods according to this invention.

BRIEF DESCRIPTION OF THE DRAWINGS

The preferred embodiments of this invention will be described in detail, with reference to the following figures, wherein.

DETAILED DESCRIPTION OF EXEMPLARY EMBODIMENTS

Figure 1:
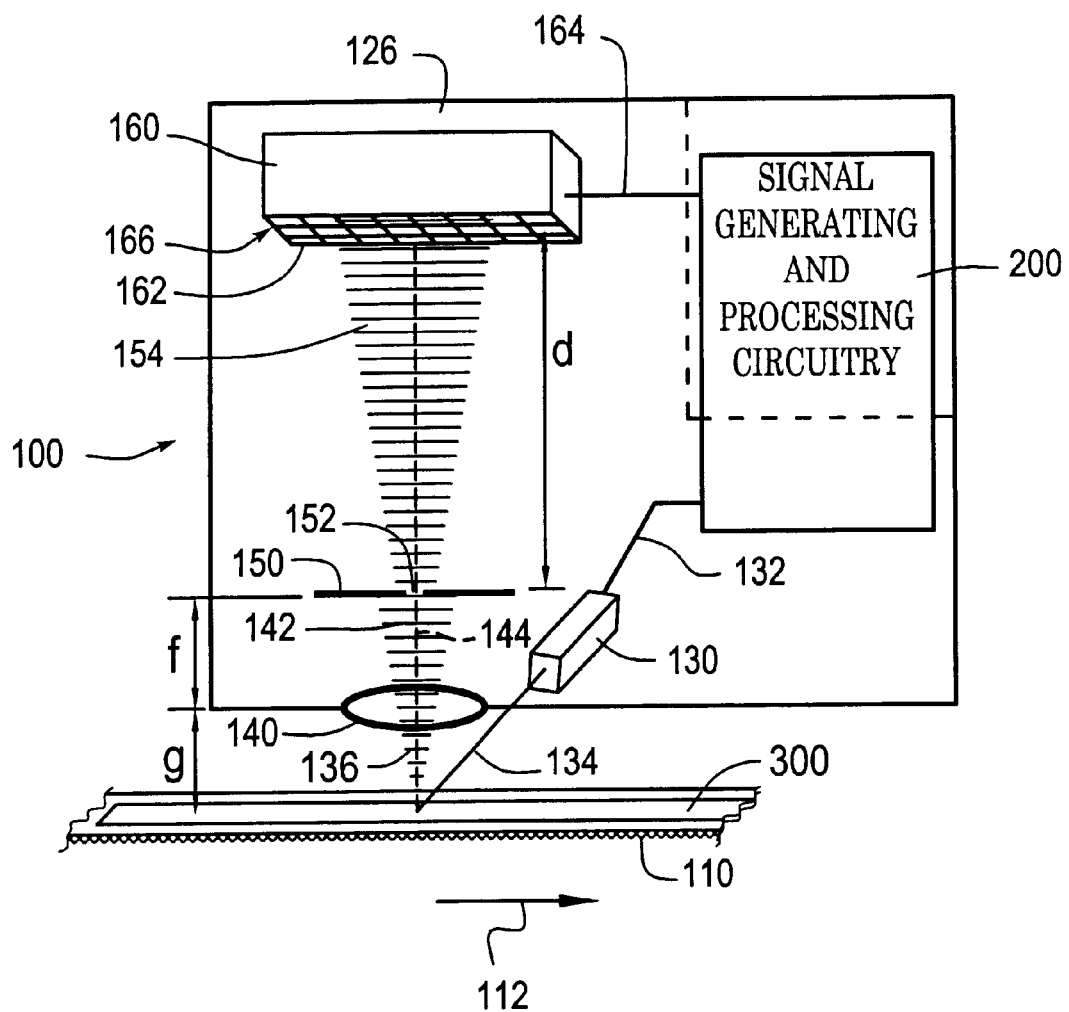
FIG. 1 is a block diagram of an optical position transducer according to this invention.

FIG. 1 is a block diagram of an optical absolute position encoder 100 usable with an integrated scale according to this invention to generate an absolute position measurement. The optical absolute position encoder 100 shown in FIG. 1 includes a readhead 126, signal generating and processing circuitry 200 and a scale 110. The scale 110 includes an integrated scale track 300. In FIG. 1, the components of the readhead 126, and their relation to the scale 110 and the integrated scale track 300, are shown schematically in a layout that generally corresponds to an exemplary physical configuration, as further described below.

In particular, the scale 110 is positioned adjacent to an illuminating and receiving end of the readhead 126, such that when the scale 110 is illuminated by light emitted from that end of the readhead 126 by a light source 130, the emitted light is selectively reflected back by the integrated scale track 300 on the scale 110 towards the image receiving optical elements positioned at that end of the readhead 126. The scale 110 is positioned at a generally stable distance from the light source 130 and an optical system housed in the readhead 126. The scale 110 moves relative to readhead 126 along an axis of relative motion, such as a measuring axis direction 112, as shown in FIG. 1. The relative motion is generally constrained, such as, for example, by conventional guideways or bearings (not shown) mounted to a frame, to maintain the proper relative position between the readhead 126 and the scale 110. The readhead 126 may include an alignment feature (not shown) which aids in mounting the readhead 126, and aligns the internal components of the readhead 126 relative to the mounting frame and/or the expected axis of relative motion 112 of the scale 110.

The scale 110 should provide a relatively high contrast image when illuminated with the wavelengths of light provided by the light source 130. In various exemplary embodiments, the scale 110 is a generally relatively-reflective member having a diffusely reflecting surface on which a series of relatively-unreflective scale elements are formed. It should be appreciated that the relatively high reflectivity of the scale 110 can be obtained by any known or later-developed material and/or structure. For example, the scale 110 can have an appropriate diffusely reflecting surface texture and be made of a relatively reflective material, such as a metal or glass, or a polymer such as Mylar, or the like. The relatively unreflective scale elements can be formed by coating the surface of the scale 110, by differentially processing the surface of the scale 110 to decrease the reflectivity of the material used to form the scale 110, by selectively depositing a relatively non-reflective material on the surface of the scale 110 or the like.

In various other exemplary embodiments, the scale 110 is made of a relatively non-reflective material, while the scale elements are made of a relatively reflective material having an appropriate diffusely reflecting surface texture. It should be appreciated that, in this case, the scale 110 can be rendered relatively non-reflective based on the materials it is formed from, by coating or otherwise treating the surface of the scale 110, or using any other known or later-developed process for selectively decreasing and/or increasing the reflectivity in the appropriate locations along the scale 110. It should be appreciated that in various embodiments, the scale 110 may have more or less specular surface portions. However, for such scales, the image contrast and/or intensity will exhibit more sensitivity to alignment variations and/or surface contamination on the scale, which may reduce the robustness and measurement accuracy of the absolute measurement system. It should also be appreciated that, in various other exemplary embodiments, the scale 110 and/or the surface elements formed on the scale 110 may include colors that enhance the contrast between the scale elements and the remainder of the scale in the image of the scale 110 detected by the light detector 160.

As shown in FIG. 1, the image receiving optical elements of the readhead 126 include a lens 140 positioned at the illuminating and receiving end of the readhead assembly 106 such that an optical axis 144 of the lens 140 is generally aligned with the illuminated area of the scale 110. In the exemplary embodiment shown in FIG. 1, the readhead 126 further includes a pinhole aperture plate 150, spaced apart from the lens 140 along the optical axis 144 by a distance coinciding with the focal length f of the lens 140, and a light detector 160 spaced apart from the aperture plate 150 along the optical axis 144, as shown in FIG. 1. Such a telecentric arrangement makes the magnification of the image of the integrated scale track 300 on the light detector 160 approximately independent of the object distance g from the lens 140 to the integrated scale track 300.

In various embodiments, if the object distance g is sufficiently well controlled, such as, for example, by accurate bearings or the like, the aperture plate 150 may be omitted.

The light detector 160 can be any known or later-developed type of light sensitive material or device that can be organized into an array of independent and individual light sensing elements, such as a camera, an electronic or digital camera, a CCD array, an array of CMOS light sensitive elements, or the like.

An exemplary spacing and positioning of the scale 110 and the readhead 126, including the lens 140, the aperture plate 150, and the light detector 160, is further described below. The mounting of the light source 130, the lens 140, the aperture plate 150, and the light detector 160 in the housing of the readhead 126 may be done according to conventional methods of miniature optical system construction and/or industrial camera construction, provided that the components are mounted in a precise and stable manner.

When the readhead 126 is suitably positioned adjacent to the scale 110, each image captured by the light detector 160 will contain a portion of the integrated scale track 300.

The light detector 160 has an array 166 of image elements 162 spaced apart along at least one axis at a known spacing. The known spacing provides the basis for measuring the displacement or offset between two similar images projected onto the light detector 160 or an image projected onto the light detector 160 and a synthetic image generically corresponding to an obtained image. The known spacing thus also provides the basis for measuring the displacement of the images of the integrated scale track 300 to resolution as fine or finer than the known spacing.

In addition, the readhead 126 includes at least a portion of the signal generating and processing circuitry 200. As shown in FIG. 1, a signal line 132 from the signal generating and processing circuitry 200 is connected to the light source 130, to control and/or drive the light source 130. A signal line 164 connects the light detector 160 and the signal generating and processing circuitry 200. In particular, each of the image elements 162 of the array 166 can be individually addressed to output a value representing the light intensity on that image element 162 over the signal line 164 to the signal generating and processing circuitry 200. Additional portions of the signal generating and processing circuitry 200 may be placed remotely from the readhead 126, and the functions of the readhead 126 can be operated and displayed remotely. The signal generating and processing circuitry 200 is described in greater detail below, with respect to FIG. 9.

As shown in FIG. 1, a light beam 134 is emitted by the light source 130 and is directed onto the integrated scale track 300 carried by the scale 110 to illuminate a portion of the integrated scale track 300. As a result, the illuminated portion of the integrated scale track 300 selectively reflects light 136 about the optical axis 144 depending on the patterns of the integrated scale track 300 that occur in the illuminated portion of the integrated scale track 300.

When the illumination angle of the light beam 134 is oblique, the angle between the incident light beam 134 and the optical axis 144 may be such that relatively specular surfaces on the scale 110 will reflect the light incident on the relatively specular surfaces away from the field detected by the readhead 126. In that case, in various exemplary embodiments, it is useful if the portions of the scale 110 that are intended to provide relatively higher intensity in the detected image are made relatively diffuse, to provide relatively diffuse surface portions that receive illumination. In various exemplary embodiments, the diffuse surface portions may be relatively diffuse due to their surface finish or material characteristics, or they may be made relatively diffuse by the application of diffuse coatings or surfacing texturing, or the like. These diffuse surface portions, due to their diffuse nature, redirect at least some of the obliquely-received light along the optical axis 144. In this case, the diffuse surface portions will tend to be brighter and/or provide higher image contrast than they would in the absence of being made relatively diffuse.

In one embodiment, the diffuse surface portions are the scale elements. In some such embodiments, the areas surrounding the scale elements are specularly reflective. In other exemplary embodiments, the diffuse portions are located in the areas surrounding relatively darker and/or specularly-reflecting scale elements.

Figure 2:
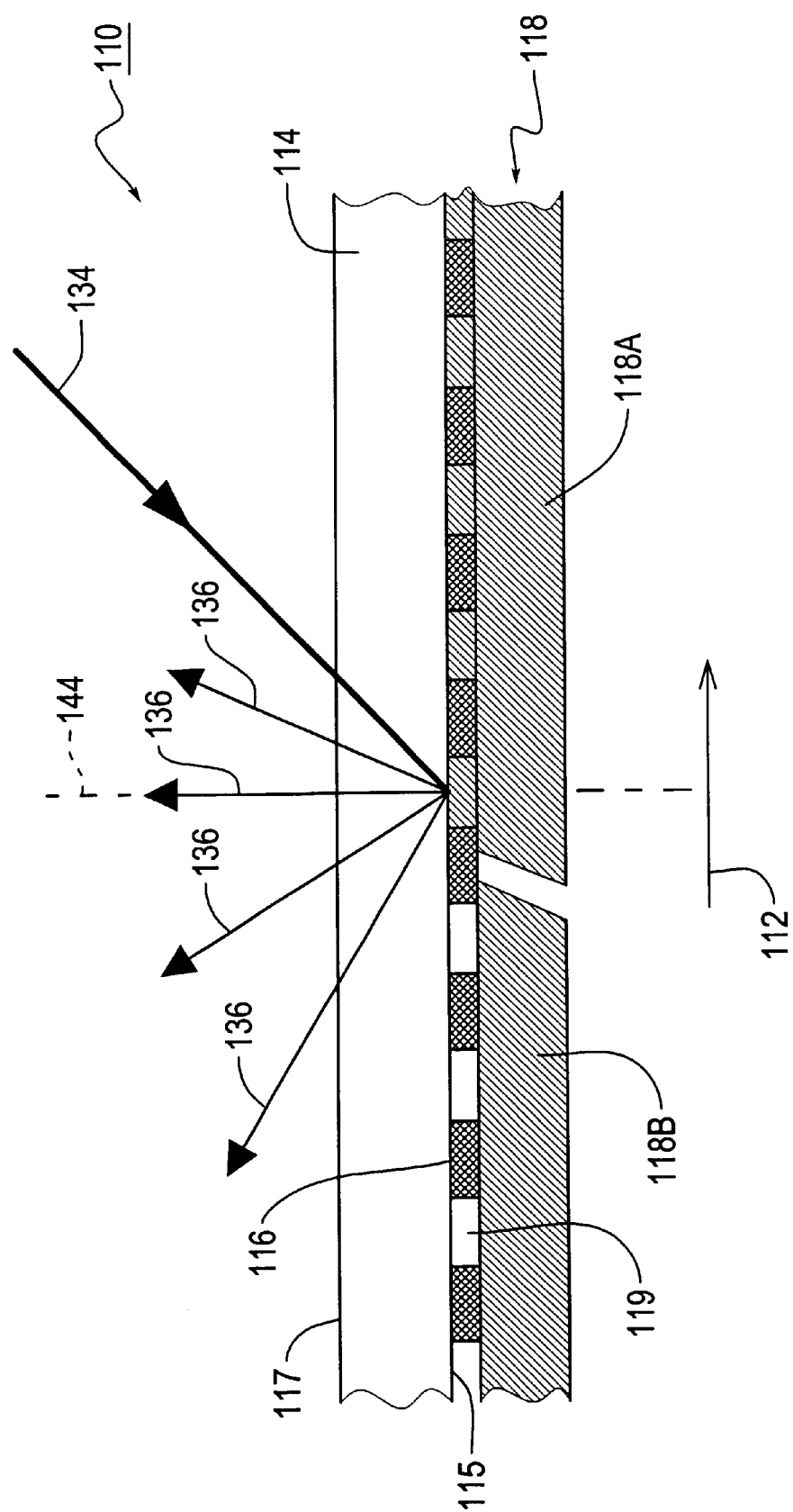
FIG. 2 is a side view of one exemplary embodiment of a diffusely-reflecting scale according to this invention.

FIG. 2 shows a side view of one exemplary embodiment of a portion of a scale 110 that is usable when the angle between the incident light beams 134 and the optical axis 144 is such that relatively specular scale surfaces will reflect the light incident on the relatively specular surfaces, that is, the reflected light 136, away from the field detected by the readhead 126. It should be appreciated that, in FIG. 2, the size of the scale elements 116 and the spaces 119 in the vertical direction is greatly exaggerated for the purpose of illustration. In various exemplary embodiments, the scale elements 116 will generally be formed by a relatively thin layer of material on the surface of the scale 110.

As shown in FIG. 2, the scale elements 116 are formed on a first surface 115 of a substrate 114 used to form the scale 110, while the scale 110 is oriented such that a second surface 117 of the substrate 114 of the scale 110 is nearer to the source of the light beam 134. In this case, the substrate 114 should be transparent to at least one wavelength of the light beam 134. A diffuse backing 118 is formed or provided on, over or very near to the first surface 115, such that the diffuse backing 118 provides a diffusely reflecting surface in the spaces 119 between the scale elements 116. This diffuse backing or coating 118 diffusely directs at least some of the incident light of the light beam 134 as the light 136 along the optical axis 144.

In one exemplary embodiment, the diffuse backing 118 is a diffusely reflecting coating-type backing 118A, which is a sprayed-on coating that coats the surface 115 in the spaces 119 between the scale elements 116. In another exemplary embodiment, the diffuse backing 118 is a diffusely reflecting substrate-type backing 118B, which is abuts the surface 115 as closely as possible and reflects the light beam 134 in the spaces 119 between the scale elements 116. In various exemplary embodiments, the substrate-type backing 118B is provided as the surface of a mounting member that holds the scale 110.

It should be appreciated that the exemplary embodiment of the scale 110 shown in FIG. 2 provides several advantages. In this exemplary embodiment, the scale 110 is easy to fabricate, in that the operable extents and locations of the diffuse portions of the scale 110 are effectively defined by the edges of the scale elements 116. Thus, the diffuse portions of the scale 110 require no special processing to control the extents or locations of these diffuse portions. Furthermore, for the orientation of the scale 110 shown in FIG. 2, contamination on the surface 117 will tend to be out of focus in the detected image of the scale. Furthermore, the surface 115 is protected from damage by the substrate 114 and/or the diffuse backing 118 and/or possibly by an external mounting element that abuts the surface 115. However, as previously discussed, in general, any scale configuration or orientation may be used to that provides a relatively high contrast scale image according to this invention when illuminated with the wavelengths of light provided by the light source 130.

The reflected light 142 from the illuminated portion of the integrated scale track 300 that reaches the lens 140 is then projected onto the light detector 160. In various exemplary embodiments, the lens 140 can be a biconvex lens having a diameter of approximately 3 mm and a focal length f of approximately 4.5 mm. As previously mentioned, in various exemplary embodiments the light 142 passes through a pinhole aperture 152 in the pinhole aperture plate 150. The lens 140 is spaced from the pinhole aperture plate 150 by a distance that is equal to the focal length f of the lens 140, making the magnification of the image of the integrated scale track 300 on the light detector 160 approximately independent of the object distance g.

In particular, when the pinhole aperture plate 150 is used, the light 154 passed by the pinhole 152 is then projected a distance d along the optical axis 144 and onto the surface of the image elements 162 of the array 166 of the light detector 160. For such a telecentric configuration, the magnification of the image features of the integrated scale track 300 thus depends primarily on the relationship between the focal length f and the distance d, and is approximately equal to d/f.

More generally, for configurations where the aperture is relatively large or the pinhole aperture plate 150 is omitted, the magnification will vary with the object distance g. In this case, the approximate magnification M of the image features within the detected portion of the light reflected from the illuminated portion of the integrated scale track 300 onto the array 166 of the image elements 162 is:

$$M \approx (f+d)/g, \quad (1)$$

where:

g is the object distance;

f is the focal length of the lens 140; and d is the distance to the surface of the array 166, beyond the focal length of the lens 140.

In various exemplary embodiments, typical values for these parameters of the optical position transducer 100 include: g≈4.5 mm, f=4.5 mm, and d=28.35 mm. As a result, the approximate corresponding magnification M is 7.3. It should be appreciated that in selecting of the size of the pinhole aperture 152 there is also a tradeoff between the depth of field of the image of the integrated scale track 300, that is, the amount of blurring of the image when then object distance g is varied due to readhead gap misalignment or the like, and the image intensity on the array 166. In one exemplary embodiment, the pinhole aperture 152 has a diameter of 0.8 mm. In various other exemplary embodiments, the pinhole aperture 152 has a diameter between 0.5 and 2.0 mm. In cases where it is difficult to precisely calculate a magnification, it should also be appreciated that the effective magnification can also be determined experimentally for a given position encoder design and specified operating parameters.

To achieve high resolution, in the projected image of the scale the average size of the periodic scale elements of the periodic portion, also referred to as the incremental scale elements, is most usefully greater than the pixel pitch of the image elements 162 of the light detector 160, that is, the size of the periodic scale elements times the projected image magnification provided by the readhead is most usefully greater than the pixel pitch. Moreover, in various embodiments of the readhead 126, in the projected image of the scale, the average size of the periodic scale elements of the periodic portion is approximately two times to ten times the pixel pitch of the image elements 162.

To acquire an image, the signal generating and processing circuitry 200 outputs a drive signal on the signal line 132 to drive the light source 130 to emit the light beam 134. The light beam 134 illuminates a portion of the integrated scale track 300, which is imaged onto the array 166 of the image elements 162 of the light detector 160. The signal generating and processing circuitry 200 then inputs a plurality of signal portions over the signal line 164, where each signal portion corresponds to the image value detected by one or more of the individual image elements 162.

To determine the current displacement of the readhead relative to the integrated scale track 300, the signal portions for a current image received from the light detector 160 by the signal generating and processing circuitry 200 are input and stored in memory. The current image is then analyzed to determine the absolute position between the readhead and the scale. In various exemplary embodiments, one row of the image elements 162 extending in a direction corresponding to the measuring axis direction 112, or at most a small number of rows, of the current image are selected for analysis. As discussed in greater detail below, the selected one or more rows are analyzed to locate a code portion that appears in the current image. This code portion is then decoded to determine the first-resolution absolute position defined by the located code portion. The location of the located code portion, or of a predetermined portion associated with the located code portion, is then determined relative to the current image frame, that is, relative to the array 166 of the image elements 162.

This determined location relative to the current image frame refines the absolute position of the readhead 126 relative to the scale track 300 from the first resolution indicated by the decoded code portion to a second resolution. In various exemplary embodiments, this second resolution is a pixel resolution and corresponds to the pixel spacing or pitch of the imaging elements 162 in the array 166. It should be appreciated that the highest achievable second resolution corresponds to a true pixel resolution, that is, a resolution that reduces the uncertainty of the absolute location measurement to a resolution corresponding to the magnification provided by the readhead 126 and no more than one to two pixel pitch increments of the array 166. However, more generally, the second resolution will locate the scale relative to the readhead 126 to within a specific period of length p of the periodic portion of the integrated scale track 300. This characteristic period p of the periodic portion of the integrated scale track 300, also called the incremental pitch, is equal in length to one of the periodically placed incremental scale elements and an adjacent space.

At least a portion of the current image is then compared, on a pixel-by-pixel basis, to a reference image for each of a number of offset positions to determine the absolute position of the readhead to the scale to a third resolution. In various exemplary embodiments, the third resolution corresponds to a sub-pixel resolution position determination of the image on the array 160. The series of comparisons generates at least one correlation curve peak, as disclosed in detail in U.S. patent application Ser. No. 09/731,671, incorporated herein by reference in its entirety.

That is, the reference image and the current image are processed to generate a correlation function. In an exemplary embodiment, the current image is digitally shifted relative to the reference image over a range of offsets, or spatial translation positions that include an offset that causes the pattern of the two images in the vicinity of the previously-located specific period to most nearly align. The correlation function indicates the degree of pattern alignment, and thus indicates the amount of offset required to get the two images to align as the images are digitally shifted. This offset then is used to refine the absolute position of the readhead 126 relative to the scale 110 from the second resolution to a third resolution corresponding to significantly less than one pixel pitch increment of the array 166 divided by the magnification provided by the readhead 100.

In various exemplary embodiments, the reference image is a synthetic image of a periodic portion of the integrated scale track 300. In various other exemplary embodiments, the reference image is a representative image captured from the integrated scale track 300 using the readhead 126.

It should be appreciated that there are a number of different techniques for comparing the reference image to the current image. For example, in a first exemplary technique, the entire length of the frame of the current image may be used when comparing the selected one or more rows on a pixel-by-pixel basis to the width of the entire frame of the reference image to generate a single correlation value. In this case, those pixels that lie in regions of the reference and current images that do not overlap with a region of the other of the current reference and displaced images are compared to pixels having a default comparison value, or are assigned a default comparison value, or the like. In other exemplary techniques, a partial image is compared. In either case, the series of correlation values that indicate the correlation peak is generated by shifting the current image by one or more pixels relative to the reference image after each comparison is performed.

Figure 3:
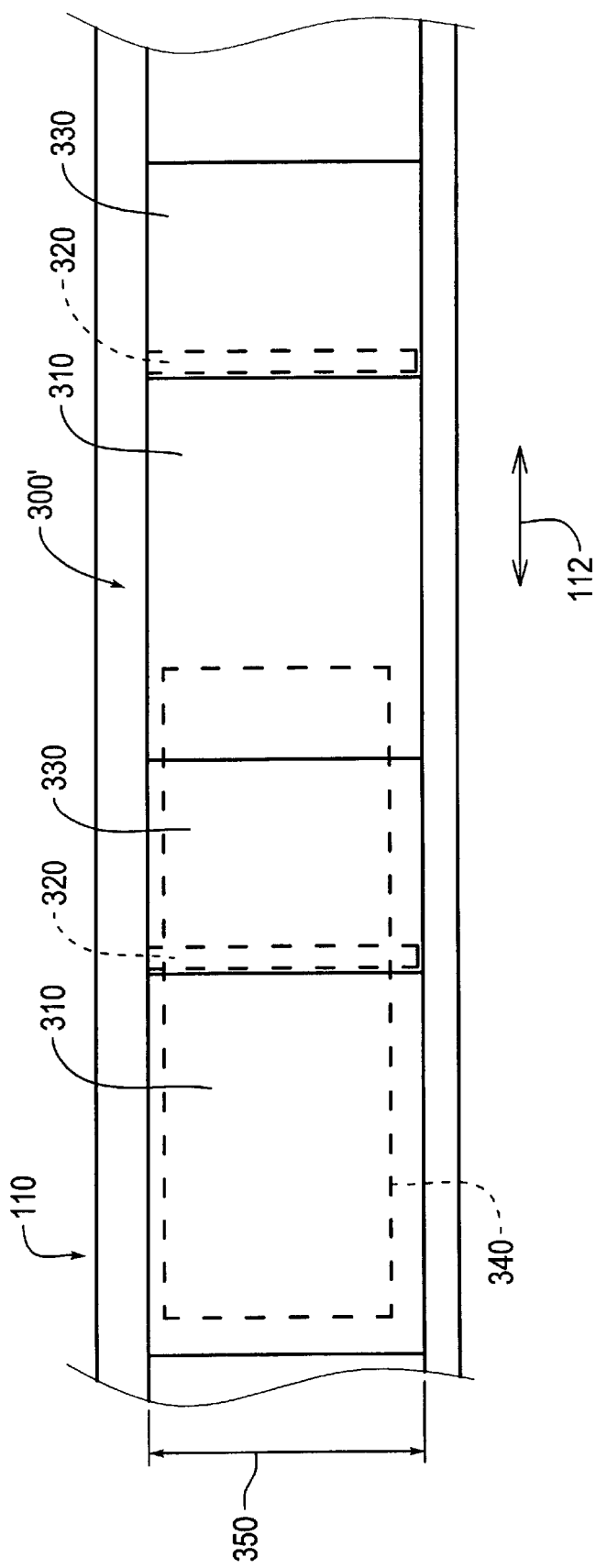
FIG. 3 illustrates a first exemplary embodiment of a generic integrated absolute scale according to this invention.

FIG. 3 illustrates the scale 110 and a block diagram layout of a first exemplary embodiment 300' of the integrated scale track 300 according to this invention. As shown in FIG. 3, the integrated scale track 300' includes a plurality of periodic portions 310, and a plurality of non-periodic portions 330. The plurality of periodic portions 310 and the plurality of non-periodic portions 330 share, or are "integrated" into, a single scale track 300, having a single track width 350, extending along the measuring axis direction 112 as shown in FIG. 3. That is, the plurality of periodic portions 310 and the plurality of non-periodic portions 330 each extends fully across the measuring axis direction by the track width 350. In various exemplary embodiments, the portions 310 and 330 are arranged in a repeating sequence along the entire length of the scale 110. Optionally, some exemplary embodiments of the non-periodic portions 330 include a predetermined feature 320.

It should be appreciated that, by integrating the both the periodic portions 310 and the non-periodic portions 330 into the track width 350, a sensing element positioned over the single integrated scale track 300 anywhere within the track width 350, such as an image element 162 of the light detector 160, is usable to sense the information contained in either the periodic portions 310 and/or the non-periodic portions 330 at various positions of the scale 110 relative to the readhead 126 along the measuring axis direction 112. Conversely, the alignment of the integrated scale track 300 and the readhead 126 in the direction transverse to the measuring axis direction 112 is not critical, which provides for easier setup and allows the measuring operations to be more robust and/or performed faster, as described further below. Furthermore, the overall width of the scale 110 and readhead 126 can be reduced.

As shown in FIG. 3, a detection window 340 that corresponds to the portion of the integrated scale track 300 that can be captured as a single image by the light detector 160 extends along the scale 110 and across at least some of the width 350 of the integrated scale track 300 on the scale 110. It should be appreciated that, due to the configuration of the integrated scale track 300 according to this invention, the width of the detection window 340 transverse to the measuring axis 112 within the integrated scale track 300 is not critical, since each row of image elements 162 extending along the measuring axis direction 112 of the detection window 340 contains substantially the same information. However, as the width of the detection window 340 is increased to approach the width 350 of the integrated scale track 300', the signal to noise ratio of the measurement system generally improves.

It should be appreciated that, in various exemplary embodiments, the size of the light detector 160 and the magnification provided by the optics 140–152 of the readhead 126 are such that, in cooperation with the extents of the portions 310 and 330 along the measuring axis direction 112, the detection window 340 extends sufficiently along the measuring axis direction 112 that a complete non-periodic portion 330 is guaranteed to appear in the detection window 340 regardless of the position of the readhead 126 along the scale 110. If the detection window 340 is at least this long, then decoding the complete non-periodic portion 330 is significantly simplified relative to situations where some positions of the readhead 126 result in two incomplete non-periodic portions 330 appearing in the detection window 340.

Alternatively, approximately as shown in FIG. 3, in various exemplary embodiments, the detection window 340 extends sufficiently along the measuring axis direction 112 that the information equivalent of a complete non-periodic portion 330 can be "reconstructed" from two separated segments of sequential non-periodic portions 330 regardless of the relative position of the readhead 126 and the scale 110. In order to satisfy this condition, the detection window 340 generally extends along the measuring axis direction by an amount equal to or somewhat greater than the distance from the edge of one non-periodic portion 330 of the scale 110 to the corresponding edge of an adjacent non-periodic portion 330. Such a distance generally includes a complete non-periodic portion 330 and a complete periodic portion 310. At some positions of the readhead 126, such a detection window 340 is also generally sufficient to include one complete centrally-located non-periodic portion 330 bounded at least by a number of complete scale elements of the periodic portions 310 that is one less than the number of scale elements in normally included in periodic portion 310.

In any case, for such an extent of the detection window 340, the patterns of the sequential non-periodic portions 330 must be chosen in light of the intended reconstruction technique. For example, the patterns may be chosen as sequential binary number codes or according to known pseudo-random "chain" code techniques, or the like. It should be appreciated that the associated reconstruction operations may be simplified and/or made more robust or faster in exemplary embodiments that include the predetermined feature 320 in the non-periodic portions 330.

In the first exemplary embodiment of the integrated scale track 300' shown in FIG. 3, the predetermined portions 320 are located at one side of the non-periodic portions 330. However, it should be appreciated that, in various other exemplary embodiments, predetermined portions 320 are located at both sides of each non-periodic portion 330. In this case, the predetermined portions 320 at one end of the non-periodic portions 330 may be distinct from the predetermined portions 320 at the other end of the non-periodic portions 330. In various other exemplary embodiments, the predetermined portions 320 are located more toward the center of the non-periodic portions 330.

The predetermined portions 320 may be any feature or combination of features that may be reliably and readily distinguished from the other pattern features of the periodic portions 310 and/or the non-periodic portions 330. For example, such features include, but are not limited to, a bright or dark bar that has a unique length along the measuring axis direction 112, a unique pattern of bright and/or dark bars along the measuring axis direction 112, and or one or more bars which have a unique color or intensity detectable by the image elements 162 of the light detector 160. In various exemplary embodiments, all of the predetermined portions 320 are identical.

Depending on the signal processing algorithms used, the predetermined portions 320 may be omitted. However, it should be appreciated that using such predetermined portions 320 may simplify the signal processing algorithms used for rapidly and robustly identifying and locating the non-periodic portions 330 within the detection window 340.

Regardless of whether the predetermined portions 320 are included, each of the non-periodic portions 330 contains a distinct and/or unique pattern of code elements. This distinct and/or unique pattern of code elements allows a particular non-periodic portion 330 that appears in the detection window 340 to be definitely determined. Since the location of each particular non-periodic portion 330 along the scale 110 is predefined or can be calculated, identifying which non-periodic portion 330 appears in the detection window 340 by determining the particular distinct and/or unique pattern of code elements of that non-periodic portion 330 allows the absolute position of the detection window 340, and thus the readhead 126, relative to the scale 110 to be roughly determined at a first resolution similar to the spacing between the non-periodic portions 330.

That is, while the location of a given non-periodic portion 330 on the scale 110 relative to a given origin point may be known to a high degree of accuracy and precision, the locations of the non-periodic portion 330 and the periodic portion 310 relative to the detection window 340 are not necessarily known based on the operations of simply determining the code value of the non-periodic portion 330 appearing in the detection window 340. In particular, the portions 310 and 330 could be located anywhere within the detection window 340.

As indicated above, the measurement value corresponding to any particular non-periodic portion 330 can be predefined by the distinct and/or unique pattern, or can be calculated from the distinct and/or unique pattern. That is, in various exemplary embodiments, the distinct and/or unique pattern is stored within a look-up table that also stores the measurement value of the nominal location on the scale 110 corresponding to the non-periodic portion 330 that contains that distinct and/or unique pattern. In this case, in various exemplary embodiments, the distinct and/or unique patterns can occur in any desired order or sequence, where no relationship between the distinct and/or unique patterns of adjacent non-periodic portions 330 needs to be present. In this case, the distinct and/or unique pattern can be distributed among the non-periodic portions 330 in any desired way, such as, for example, to increase the distinction between the distinct and/or unique patterns of adjacent non-periodic portions.

In various other exemplary embodiments, the distinct and/or unique patterns can objectively correspond in some way to the location of the non-periodic portions 330 containing them. This correspondence can then be used to directly determine or calculate the absolute position of the non-periodic portion 330 along the scale 110, and thus the absolute position of the detection window 340 and thus the readhead 126. In various exemplary embodiments, the non-periodic portions 330 are arranged along the scale 110 at a regular pitch, or spacing. The distinct and/or unique pattern of a particular non-periodic portion 330 defines a binary or higher-modulus number as the unique pattern or code word. The numbers indicated by the non-periodic portions 330 that are sequential along the scale 110 are also sequential.

Thus, for example, a first sequential non-periodic portion 330 would have a distinct and/or unique pattern that defines the number "1". The number can then be increased by one increment for each successive sequential non-periodic portion 330. In various exemplary embodiments, if the numbers begin with one and are incremented by one, when a particular number is then multiplied by the pitch, or spacing, of the non-periodic portions 330 on the scale 110, the absolute position of that non-periodic portion 330 from the origin is thus known.

It should be appreciated that, when sequential numbers or code words are used, it is particularly fast and easy to reconstruct a complete code word from a trailing segment of a number or code word of a non-periodic portion 330 imaged in a left portion of the detection window 340 and a leading segment of a number or code word of a non-periodic portion 330 imaged in a right portion of the detection window 340. Thus, sequential numbers or code words are of particular utility when the span of the detection window 340 relative to the integrated scale track 300' is desired to be of a minimum usable size that is smaller than that which guarantees that at least one complete uninterrupted non-periodic portion 330 is included in an every possible scale image. Of course, more complicated and irregular constructions, formulas and methods can be used to relate the distinct and/or unique patterns and the location of the non-periodic portions 330 that contain these distinct and/or unique patterns.

It should be appreciated that, although each particular non-periodic portion 330 is distributed over a zone extending along the measuring axis direction, each particular non-periodic portion 330 nevertheless uniquely corresponds to or identifies a measurement value associated with a particular point along the scale 110. It should be appreciated that, for each particular point along the scale corresponding to measurement value indicated by a particular non-periodic periodic portions 310, that point can be referred to as a local datum.

In general, the local datum may be the edge, center or other any other localizable characteristic of one or more specifically recognizable bright and/or dark bars on the scale 110 that can be located relative to the detection window 340. It should be appreciated that, according to this invention, the local datum is not necessarily a separate feature or characteristic that must be specially added to an integrated scale track 300. Rather, the signal processing associated with the images of the integrated scale track 300 may implicitly choose and use any specifically recognizable localizable feature or characteristic of the integrated scale track 300 as a local datum.

In one exemplary embodiment, the local datum is conveniently chosen as a characteristic of a bar of the periodic portion 310 that is immediately adjacent the non-periodic portion 330 that indicates the measurement value associated with that local datum. In a further exemplary embodiment, the local datum is conveniently chosen as a characteristic of the predetermined portion 320 associated with the non-periodic portion 330 that indicates the measurement value associated with that local datum. Such exemplary embodiments may simplify the signal processing algorithms required for rapidly and robustly identifying and locating the local datum within the detection window 340.

The local datum can be located relative to the detection window 340 before, during or after the non-periodic portion 330 that appears in the detection window 340 has been analyzed to determine the first-resolution absolute position. For example, identifying and/or locating the local datum may be based on well-known edge-finding or centroid-finding techniques, or the like, applied to image intensity values associated with the various image elements 162. In any case, the location of the local datum relative to the detection window 340 is used to refine the resolution of the absolute position determination to a second resolution finer than the previously-described first resolution.

It should be appreciated that, by using an integrated scale track 300 according to this invention, only any one row, or at most any few rows, of the imaging elements 162 extending in the direction generally corresponding to the measuring axis direction 112 needs to be analyzed to determine the location of the local datum to the second resolution. Thus, a system using an integrated scale track 300 according to this invention can achieve fast signal processing while remaining very robust with respect to static and dynamic misalignments of the readhead 126 and scale 110 transverse to the measuring axis direction 112.

In general, it is both necessary and sufficient that the second resolution position determination be reliable, robust and accurate to a resolution finer than approximately ½ of the incremental pitch of the periodic portions 310, to insure that the uncertainty in the second resolution position determination is within one such increment of the incremental pitch. In such a case, position determinations including further resolution refinement based on analysis of a periodic portion 310 in the detection window 340 will be unambiguous, even if one period included in the periodic portion 310 is generally indistinguishable from the next.

It should also be appreciated that, in terms of the scale image projected onto the light detector 160, it is both necessary and sufficient that the location of the local datum be determined relative to the detection window 340 to a resolution finer than approximately ½ of the pitch of the projected image of the scale bars of the periodic portions 310 on the light detector 160, to insure that the uncertainty of the local datum location is within one such pitch increment on the light detector 160. In various exemplary embodiments, the incremental pitch and the magnification provided the lens 140 are chosen such that the pitch of the projected image of the scale bars of the periodic portions 310 on the light detector 160 is at least three times the pixel pitch of the image elements 162. Accordingly, the location of the local datum needs be determined relative to the detection window 340 to a resolution no better than approximately one pixel pitch of the image elements 162.

In various other exemplary embodiments, a robust and simple datum locating technique is chosen, such as edge-finding at a resolution equal to one pixel pitch or greater, based on pixel intensity value transitions, for example. Then, using the anticipated simple datum locating technique, an achievable local datum location resolution in terms of the pixel pitch is determined or confirmed by experiment, for the relevant anticipated scale features and realistic misalignments, contamination, and the like. Finally, the incremental pitch used for the periodic portions 310 is chosen such that the achievable local datum location resolution under the variety of realistic experimental conditions is not more than approximately three-eighths of the pitch of the projected image of the scale bars of the periodic portions 310 on the light detector 160. Such configurations are robust, and further allow both simple and fast signal processing.

The periodic portion 310 can be used to refine the determination of the absolute position scale relative to the detection window 340, and thus the readhead 126, to a third resolution. The third resolution has accuracy that is at least a few times finer, and may be several times finer, than the incremental pitch. The third resolution may correspond to locating the projected scale image relative to the detection window 340 to a sub-pixel resolution.

As previously described with reference to FIG. 2, the scale 110 generally includes scale elements 116 and spaces 119 separating the scale elements. The periodic portion 310 has, in various exemplary embodiments, a pattern of scale elements 116 and spaces 119 arranged according to an underlying incremental pitch. One incremental pitch corresponds to the dimensions along the measuring axis of one scale element 116 and one space 119. In various exemplary embodiments, the spaces 119 and the elements 116 have equal dimensions along the measuring axis direction 112, but they need not be equal.

In various exemplary embodiments, the periodic portion 310 includes the maximum possible number of scale elements 116 and spaces 119 that can be included in the periodic portion 310 according to the underlying incremental pitch. However, in various other exemplary embodiments, less than this maximum possible number of the scale elements 116 are included in a periodic portion 310. In still other exemplary embodiments, even "odd sized" or "misplaced" scale elements can be included in the periodic portion 310, provided that the number of "regular" scale elements 116 and the accuracy of the placement of such scale elements 116 relative to the underlying pitch are sufficient to enable the location the projected scale image of the periodic portion 310 relative to the detection window 340 to be determined to a sub-pixel resolution.

For example, in one exemplary embodiment, the number of "regular" scale elements 116 that are included in the periodic portion 310 is the number sufficient to determine a correlation curve having a peak or valley amplitude indicative of a relatively good correlation, as described in greater detail below. In various exemplary embodiments, where the image rows extend along the measuring axis direction in the image, by comparing some or all of the rows of at least the portion of the current image corresponding to the periodic portion 310 to a reference image that contains at least a similar periodic portion, on a pixel-by-pixel basis, and by shifting the current and reference images relative to each other by one pixel to create each comparison value, a correlation curve can be created.

It should be appreciated that, in various exemplary embodiments where the second resolution corresponds to resolution of one pixel pitch, the correlation curve is created only to obtain the subpixel resolution. The incorporated 671 application discloses a variety of methods for determining to a high accuracy the pixel and/or subpixel location of a peak or trough of a correlation curve. It should be appreciated that any of these techniques, or any other appropriate known or later developed technique, can be used to determine the offset position of the projected scale image relative to the detection window 340 to a pixel and/or subpixel resolution. Thus, the position of the scale 110 relative to the readhead 126 is determined to a third resolution and accuracy which is at least a few times finer, and may be several times finer, than the incremental pitch.

It should be appreciated that, when a coded scale track includes predictable periodic portions such as the periodic portions 310 of the integrated scale track embodiment 300' according to this invention, the high-resolution or third resolution position detection techniques usable with such periodic portions are particularly simple, fast and accurate relative to the techniques and results associated with other types of coded scale tracks such as pseudo-random scale tracks and the like. For example, in embodiments that use software and/or hardware based correlation techniques for the high-resolution position determination, the reference image or the hardware detector structure can be a single fixed periodic configuration. Modifications of the hardware detector configuration, or updating or matching the reference image to the current image, or the like, are not required, since all the periodic portions are substantially similar and predictable. Furthermore, the accuracy of software or hardware based detection of the position of a substantially or fully periodic image or image portion tends to be less sensitive to image blur due to readhead misalignment or the like.

Figure 4:
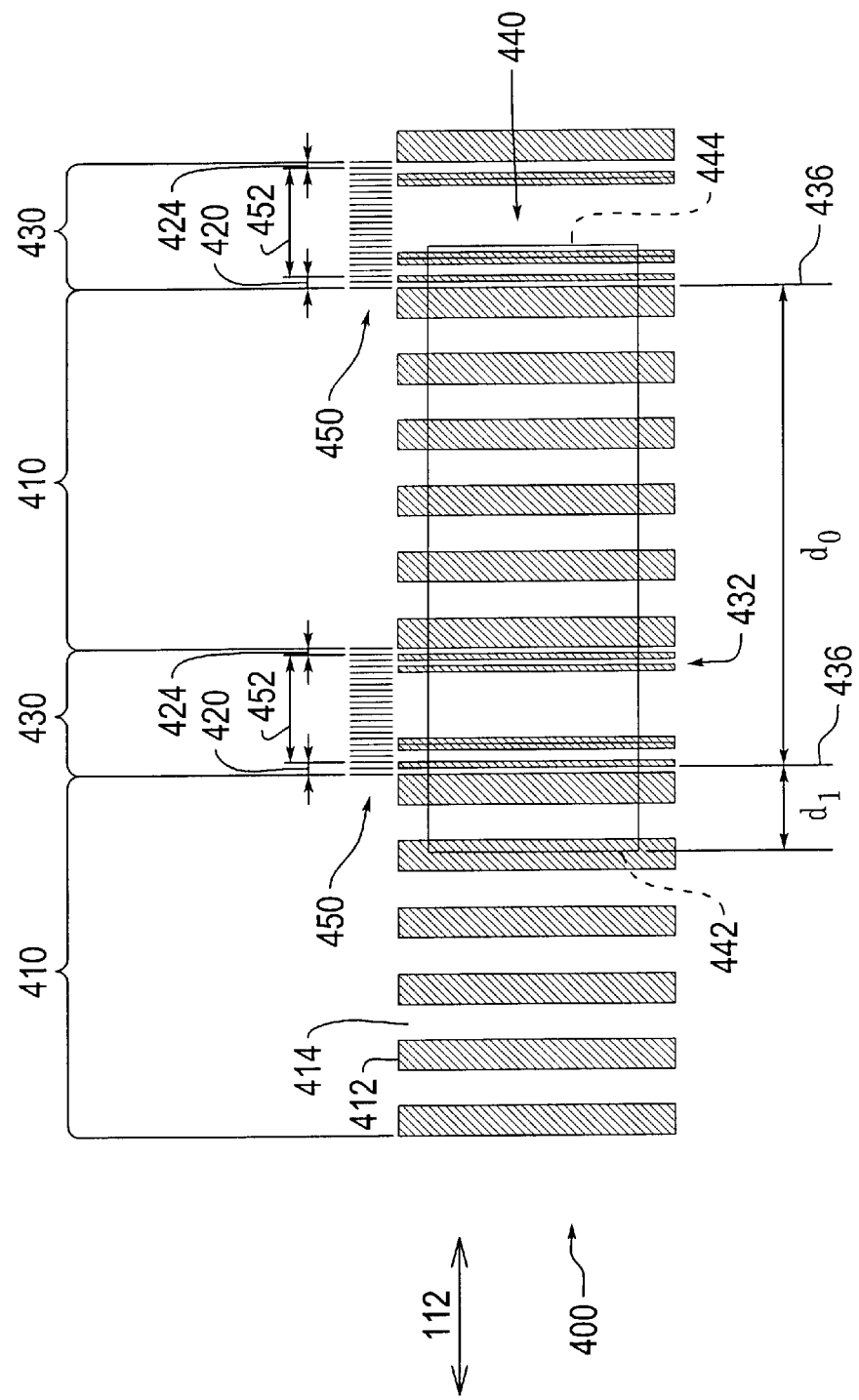
FIG. 4 illustrates a portion of one specific exemplary embodiment of the generic integrated absolute scale shown in FIG. 3.

FIG. 4 illustrates one exemplary embodiment of an integrated absolute scale track 400 corresponding to the integrated scale track 300' shown in FIG. 3. As shown in FIG. 4, the integrated scale track 400 has periodic portions 410, and non-periodic portions 430 alternately arranged along the measuring axis direction 112. In the exemplary embodiment shown in FIG. 4, the non-periodic portions 430 include predetermined pattern portions 420. The readhead 126 moves relative to the integrated scale track 400 along the measuring axis direction 112. The periodic portions 410 include scale elements 412 that each have the same extent along the measuring axis direction 112 and that are separated from each other by spaces 414. The spaces each have the same extent along the measuring axis direction 112. In various exemplary embodiments, the extents of the scale elements 412 and the spacers 414 are the same, although they do not need to be.

In various exemplary embodiments, the non-periodic portions 430 of the integrated scale track 400 include a plurality of code zones, which are indicated in FIG. 4 by the zone indicator lines 450. Code elements 432 are present or absent in each code zone to provide a distinct and/or unique pattern of code elements in each non-periodic portion 430, as described above. In various exemplary embodiments, the extents of each code zone 450 along the measuring axis direction 112 are less than the extents of the scale elements 412. Thus, the corresponding individual code elements 432 are narrower along the measuring axis direction 112 than the scale elements 412, even in code embodiments where they are touching and exhibit no distinguishable boundary or edge along the measuring axis. In various exemplary embodiments, the extents of each code zone 450 are conveniently made the same. However, in various other exemplary embodiments, the extents of various code zones 450 may vary. In this case, this variation is accommodated in the corresponding signal processing algorithms.

The non-periodic portions 430 are spaced apart by one periodic portion 410. Each non-periodic portion 430 indicates the measurement value associated with a local datum 436. As previously discussed, the local datum 436 is not necessarily a separate feature or characteristic of the integrated scale track 400. Rather, signal processing associated with the integrated scale track 400 implicitly chooses any specifically recognizable localizable feature or characteristic of the integrated scale track 400 as a local datum 436. In the exemplary embodiment shown in FIG. 4, the local datum 436 is conveniently chosen as the right edge of the scale element 412 of a periodic portion 410 that is immediately adjacent to the left of the first code element 432 of the non-periodic portion 430. However, it should be recognized that this choice is somewhat arbitrary, as described above. Alternatively, the local datum 436 can be a characteristic identifiable in the non-periodic portion 430. In the embodiment shown in FIG. 4, each local datum 436 is spaced from the adjacent local datum 436 by a distance $d_0$. In various exemplary embodiments, the distance $d_0$ is chosen such that there is always one non-periodic portion 430 within the detection window 440.

In various exemplary embodiments, the code elements 432 are relatively reflective elements, and the code zones 450 are relatively less reflective in the absence of a code element 432. In particular, if the code zones 450 having the relatively reflective code elements 432 are decoded as a binary 1, then empty code zones 450 are decoded as binary 0. Thus, the pattern of code elements 432 in the code zones 450 form a binary number or code word that can be decoded to identify the measurement value of the local datum point 436 and, thus, the location of detection window 440 and the readhead 126, to the first resolution.

As shown in FIG. 4, the exemplary predetermined portions 420 use the first two code zones 450 on the left of the non-periodic portions 430, and are identical regardless of the position of a particular predetermined portion 420 along the measuring axis direction 112. It should be appreciated that the function of these predetermined portions 420 is primarily to enable the signal processing that searches for a non-periodic portion 430 in the detection window 440 to be simple, fast and robust. For example, the empty code zone 450 on the left of the predetermined portion 420 is always bounded by a periodic scale element 412 on its left and by a code element 432 in the code zone 450 on the right of the predetermined portion 420.

As a result, by analyzing a row of pixel data in the detection window 440 and moving from left to right, this empty code zone 450 is easily recognized as the first space having a width less than each of the periodic scale elements 412 and spaces 414 in the periodic portion 410 to its left, without the need for further or more complicated searching or analysis. Thus, it is further known by design that a specific number of code zones 450 following the predetermined portion 420 to the right contain the unique code that corresponds to the measurement value of the local datum 436. As previously mentioned, in various other exemplary embodiments, the predetermined portions use alternative patterns to that shown in FIG. 4 and are located at the right side, or both sides of the non-periodic portions to complement various alternative signal processing methods.

In the exemplary embodiment shown in FIG. 4, the unique codes are defined the binary bit values corresponding to the seventeen code zones within the span indicated by the line 452. The code zone 424 on the right hand side of the non-periodic portion 430 is simply an empty code zone 450 that provides a space to clearly define the edge of the periodic scale element 412 to its right. However, in various other embodiments, the code zone 424 may contain code elements 432, and thus may provide an additional binary bit value to extend the possible number of unique codes, which in turn increases the potential absolute measurement range of the integrated scale track 400.

In one exemplary embodiment of the integrated scale track 400, the scale elements 412 and spaces 414 each have an extent along the measuring axis of 20 $\mu$m, and thus define an incremental pitch of 40 $\mu$m. The code zones have an extent of 5 $\mu$m, and do is 320 $\mu$m, which is eight times the incremental pitch. The detection window 440 corresponds to a light detector 160 having approximately 352 pixels in the direction corresponding to the measuring axis direction 112, such that a 5 $\mu$m region on the scale 110 projects an image corresponding to approximately 4.4 pixels on the light detector 160. Thus, the 17-bit codes arranged in the span 452 allow an absolute range of nearly 42 meters while taking up less than one-third of the integrated scale track 400. Thus, two-thirds of the area of the integrated scale track 400 is used for the periodic portion 410, enhancing the speed and accuracy of high-resolution position determination, as described above. The inventors have achieved reliable submicrometer measurements using comparable scale parameters and a compact readhead. Thus, compact and practical absolute position measurement devices according to the principles of this invention provide a remarkable combination of high resolution and absolute measurement range.

Furthermore, when spatially sequential 17 bit codes are sequential binary numbers, as shown in FIG. 4, they may directly indicate the measurement value of the local datum. This eliminates the need for pseudo-random codes and the like and the associated memory circuits, lookup tables and associated signal processing. Thus, the inventors have found that the signal processing systems associated with integrated scale tracks including sequential binary numbers is generally significantly faster and more economical than those including pseudo random coding and the like, especially for longer measurement ranges requiring a larger number of codes and especially when the signal processing includes the numerical processing capability of a DSP.

Regarding the configuration shown in FIG. 4, it should be appreciated that in such embodiments, the relatively larger scale elements 412 and spaces 414 are robustly visible despite contamination, defects, and static and dynamic variations in the gap between the scale 110 and the readhead 126, which enhances the robustness and accuracy of the associated high-resolution position determination. Conversely, the relatively finer code zones 450 and the code elements 432 are adequately visible despite contamination, defects, and static and dynamic variations in the gap between the scale 110 and readhead 126, but fine enough to allow a long absolute range by providing a large number of bits in a small proportion of the scale length/area, so that more of the scale length/area can be dedicated to the information in the periodic portions 410 that enhances the high-resolution position determination. Of course, the code zones 450 can be made relatively coarser, such that, for example, the size of the code zones 450 approaches the size of the scale elements 412 and the spaces 414. However, in such cases, the non-periodic portion 430 becomes relatively longer and the corresponding length of the readhead 126 relatively increases and/or the maximum absolute range relatively decreases for a reduced number of code bits readable within a given readhead size.

It should be further appreciated that, when all scale elements 412 and code elements 432 extend the full width 350 of the integrated scale track 400, the alignment of the readhead 126 transverse to the measuring axis direction 112 is not critical. As a result, any of the rows of pixels corresponding to a broad central zone across the detection window 440 can be guaranteed to contain the information needed to locate the local datum 360, and to locate and decode the associated unique code. This feature allows robust and fast signal processing that can eliminate the special search operations, or other 2-axis operations, otherwise needed in order to compensate for potential misalignments.

It should also be appreciated that it is particularly easy and economical to fabricate scales including integrated scale tracks according to this invention, because only the periodic portions 410 require the accurate placement and fabrication commensurate with the desired overall scale accuracy. For example, using the photo-resist exposure methods often used for conventional high accuracy incremental scales, each of the scale elements 412 can be defined using known and highly accurate continuous step and repeat exposure procedures. Alternatively, a relatively long mask fabricated by such a procedure can be used. In either case, steps within the non-periodic portions 430 receive no exposure or are not processed during this initial fabrication phase.

Then, since the non-periodic portions 430 according to this invention do not require particularly accurate location and fabrication, the unique patterns of the non-periodic portions 430 can be exposed later using a programmable high-speed scanning laser exposure system or the like. It should be appreciated that the most accurate operations are thus simplified and made more economical and accurate, while the accuracy of the unique coding operations is relaxed in order that they may be made more flexible, fast and economical.

In operation, an image of the scale 400 is captured corresponding to the detection window 440 shown in FIG. 4. This image is then analyzed to identify the predetermined portion 420 that appears in the detection window 440. Because the structure of the scale track 400 is known a priori, once the predetermined portion 420 is located, the code portion is known to occur immediately to the right of the located predetermined portion 420. The pattern and extents of the bright and dark portions of the captured image, corresponding to the code elements 432 and the spaces in the code zones 450 corresponding to the span 452, is determined to extract the code word defined by these patterns and extents.

Then, the extracted code word either is used as an address entry into a look-up table or is used as a variable in a formula to determine the measurement value of the local datum 436, and, thus, the location of the detection window 440 and the readhead 126 relative to the scale 110 to a first resolution approximately corresponding to the spacing of the local datums 436 and/or the non-periodic portions 430. In various exemplary embodiments, a given feature of the periodic portion 410 appearing in the detection window 440 near the non-periodic portion 430 serves as a local datum 436.

To further refine the absolute position measurement resolution, it is convenient and sufficient to find the location of the local datum point 436 relative to a left edge 442, or a right edge 444, of the detection window 440. When the left edge 442 of the detection window 440 is used as the reference point relative to the left local datum point 436, as shown in FIG. 4, the number of pixels corresponding to the offset distance $d_1$ is easily determined to within one or a few pixels, and this pixel distance may be converted to the actual offset distance $d_1$ based on the known geometric characteristics of the light detector 160 and the magnification of the readhead 126.

When the offset distance $d_1$ is added to the measurement value of the local datum 436, the absolute position of the readhead 126 relative to the scale 110 is known to a second resolution, which is finer than one-half the incremental pitch of the periodic portion 410, and approximately corresponding to one or a few times the pixel pitch, divided by the magnification of the readhead 126. It should be appreciated that, in general, the offset distance $d_1$ can be defined based on either the right hand edge 444 or the left hand edge 442 in correspondence with the associated signal processing.

It should be appreciated that the relatively lower resolution position determining operations described above have so far used relatively little of the position information available in the detection window 440. To further refine the absolute position measurement between the readhead 126 and the scale 110, it is desirable to use more of the information in the detection window 440, so that the effects of local fabrication inaccuracies, defects, contamination and the like are averaged out to provide a better signal to noise ratio and a more accurate position determination. In particular, it is desirable to make a position determination based on some or all of the information and/or signals arising from the periodic portions 410 present in the detection window 440. In effect, the goal is to refine the estimate of the previously described offset distance $d_1$.

Figure 5:
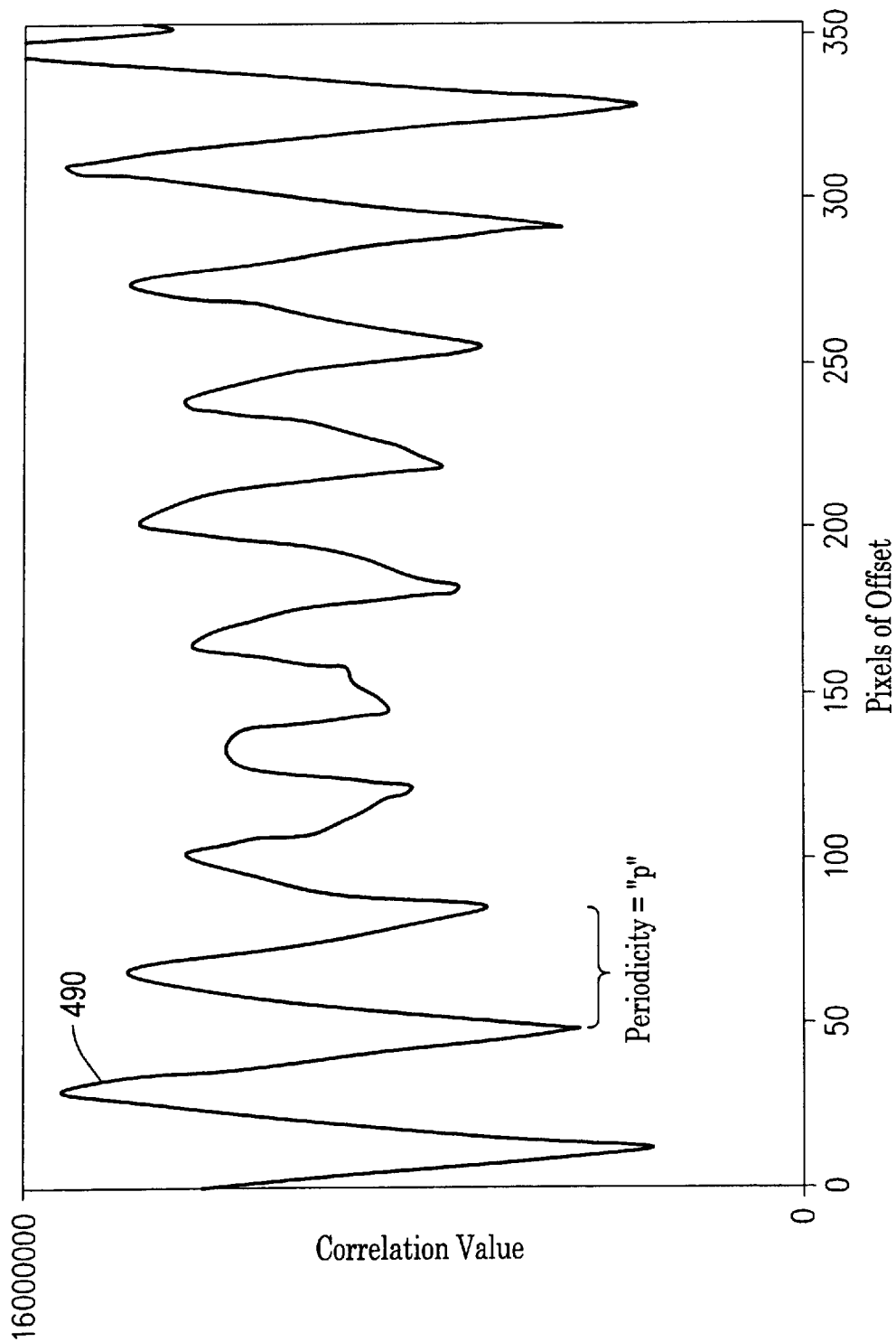
FIG. 5 is a graph illustrating the correlation function result for a periodic current image and a reference image.

In various exemplary embodiments, a correlation function, such as that shown in FIG. 5, is generated by comparing the captured image corresponding to the detection window 440 to a reference image selected to match the structure of the scale elements 412 and spaces 414 in the periodic portions 410. The reference image can be an actual image obtained from the scale 110 or can be a synthetic image. The only requirement for the reference image is that the reference image have a periodic portion corresponding to the structure of the periodic portion 410 of sufficient size to allow an adequate correlation curve to be generated. For example, in various exemplary embodiments, the reference image may be shorter along the measuring axis direction than the complete detected images of the scale 110, such that it may include only the number of consecutive periodic scale elements 412 guaranteed to occur consecutively in every detected image of the scale 110.

It should be appreciated that, in various other exemplary embodiments, if a synthetic image is used, the synthetic image may include only the structure of the scale elements 412 and spaces 414 of the periodic portion 410, but extending across the full length of the synthetic image. Alternatively, the synthetic image can include a periodic portion 410, the predetermined portion 420 and a representative non-periodic portion 430. Similarly, a reference image obtained from the scale 110 itself will generally include the periodic portion 410, the predetermined portion 420 and one of the non-periodic portions 430. However, it should be appreciated that any of these types of reference images can have an appropriate section of the image corresponding to the location of the non-periodic portion(s) 430 "edited out", or skipped during the correlation operations. For a real reference image, the location of the non-periodic 430 can be determined, for example, based on any of the various the code zone locating methods described above.

It should also be appreciated that, if the readhead 126 is mounted with a yaw misalignment relative to the scale 110, the actual images from the scale 100 will be rotated relative to an ideally aligned reference image of the scale 110. However, in general, such a limited image rotation due to misalignment will be consistent regardless of the position of the readhead 126 along the scale 110. Therefore, such image rotations will create an error that is approximately the same at each position and therefore can be ignored in various exemplary embodiments. In various other exemplary embodiments, the amount of rotational misalignment between an actual image and an ideally aligned reference image is determined, during a calibration procedure, using any known or later-developed rotational correlation method, or the like. The reference or actual images are then computationally rotated into alignment, prior to or during the signal processing that occurs during normal operation, to enhance the accuracy of correlation operations and the accuracy of position determinations. In yet other exemplary embodiments, the reference image is derived from an actual image including the consistent rotational misalignment. In this case, the reference image is inherently rotationally aligned with the subsequent actual images.

FIG. 5 shows a correlation curve 490 obtained when the reference image includes a representative non-periodic portion 430 in addition to the structure of the scale elements 412 and spaces 414 of the periodic portion 410. As a result, as the offset between the reference image and the captured image corresponding to the detection window 440 causes the non-periodic portion 430 of the reference image to align with the non-periodic portion 430 of the captured image, the peaks and valleys of the correlation curve 490 reach their maximum amplitude. In contrast, when the offset between the reference and captured images is such that a periodic portion 410 of one of the images aligns with the non-periodic portion 430 of the other image, the amplitude of the peaks and valleys of the correlation curve reaches a minimum. However, the overall periodicity p between adjacent peaks, or between adjacent valleys, in the correlation curve, corresponding to the incremental pitch of the periodic portions 410, remains visible throughout the correlation curve 490 despite the presence of the non-periodic portions.

It should be appreciated that the initial estimate of the offset distance $d_1$, according to the operations described above, is certainly accurate to less than one-half of an incremental pitch increment. Accordingly, to refine the absolute position measurement, it is generally only necessary to determine the offset position of any one or more higher amplitude trough or peak, depending on the type of correlation used, relative to its expected offset position for an image where the local datum 436 coincides with its reference position.

To generate the correlation curve, in general, for faster signal processing, only a single row, or only a few rows, of the captured image are initially analyzed. In various exemplary embodiments, this is continued during a first portion of the correlation curve analysis, where a crude correlation curve is generated by using only the single row or only the few selected rows of the image to locate the approximate position of at least one peak or trough to be used to refine the position estimate. Generally, this can be any peak or trough having an amplitude indicative of a relatively good correlation, which in some exemplary embodiments may be any peak or trough of the correlation curve.

Once such an appropriate peak or trough is identified, in a second portion of the correlation process, the correlation curve is generated for each of the pixel offset values in the vicinity around that selected peak or trough. This allows the more time-consuming full pixel-by-pixel analysis for all rows of the reference and captured images to be performed, but only for those offset positions in the vicinity of the identified peak or trough that will be used in refining the location of the identified peak or trough to determine the actual offset position. The number of rows of pixels used for during this high-accuracy second portion of the correlation process depends on the desired accuracy. For the highest accuracy, all rows included in the detection window 440 are used.

Once this higher-accuracy correlation curve is generated in the vicinity of the peak or trough, any of the various methods identified in the incorporated 671 application can be used to identify the pixel offset value of the peak or trough to a sub-pixel resolution. The difference between the actual peak or trough offset value and its expected offset value for an image where the local datum coincides with its reference position can be used to refine the resolution and accuracy of the estimated offset distance $d_1$, and the resulting absolute position determination.

For example, in general, the previously-estimated offset distance $d_1$ may in general be broken down into a portion equal to an integer number times the incremental pitch plus or minus an additional amount less than one-half of the incremental pitch. To refine the previously estimated the offset distance $d_1$, the additional amount is truncated and replaced with the difference between the actual peak or trough offset value and its expected offset value for an image where the local datum coincides with its reference position.

In various other exemplary embodiments, the second portion of the correlation process can be omitted. In this case, the less accurate or complete correlation curve values can be used to identify the pixel offset value of the peak or trough to the best resolution possible, as outlined in the 671 application, and the accuracy will still be sufficient for a number of useful applications.

Figure 6:
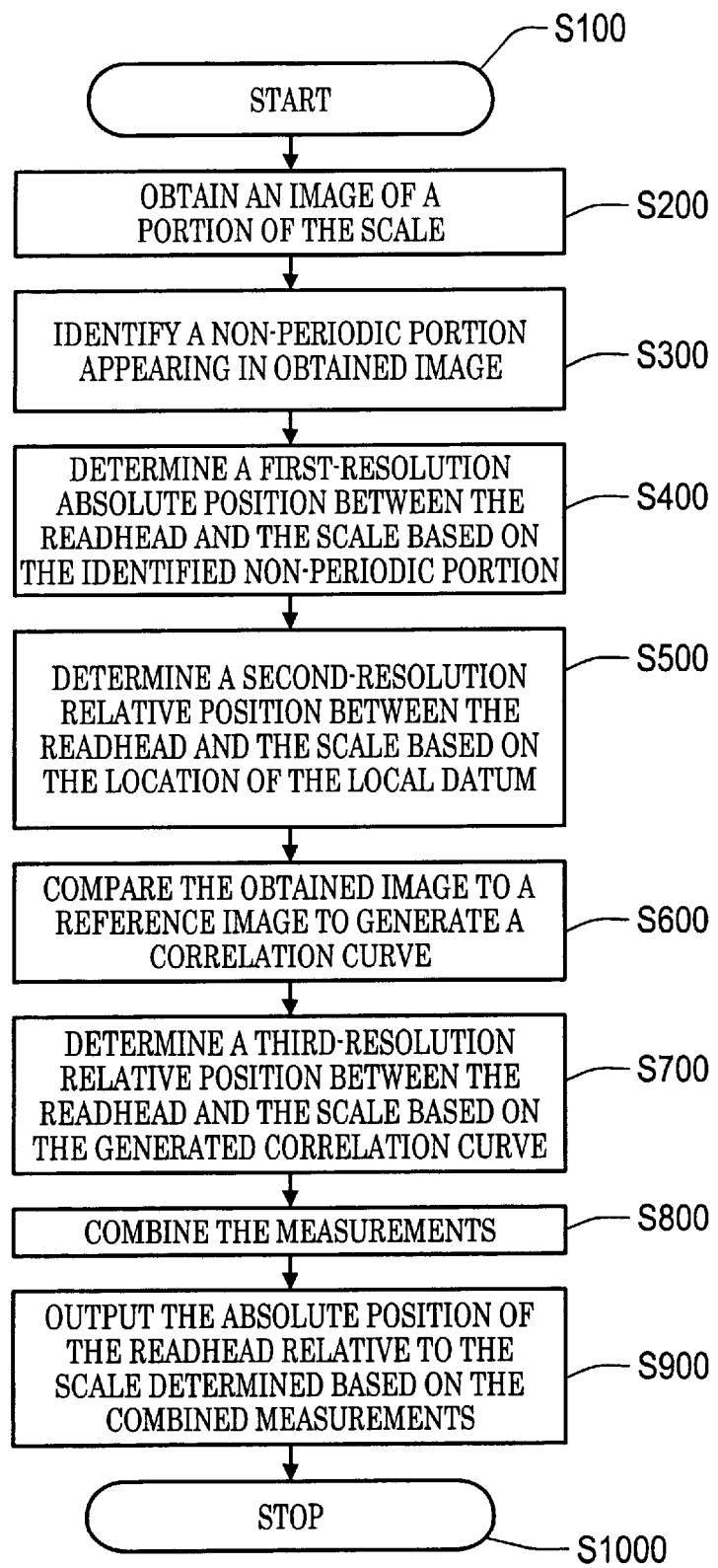
FIG. 6 is a flowchart outlining one exemplary embodiment of a method for determining the absolute position of a readhead relative to the integrated absolute scale shown in FIG. 4.

FIG. 6 outlines one exemplary embodiment of a method for determining a high-resolution absolute position measurement between a readhead and a scale according to this invention. Beginning in step S100, operation of the method continues to step S200, where an image of a portion of the scale is obtained. Of course, this image of the portion of the scale needs to include images of each of one or more periodic portion and one or more non-periodic portions or segments of two non-periodic portions that can be effectively combined to determine the information included in a complete non-periodic portion. Then, in step S300, a non-periodic portion that appears in the image of the portion of the scale obtained in step S200 is identified as a non-periodic portion. Next, in step S400, a first-resolution absolute position between the readhead and the scale is determined based on the information contained in the identified non-periodic portion appearing in the obtained image. Operation then continues to step S500.

In step S500, a second-resolution relative position between the readhead and the scale is determined based on the location of the local datum associated with the identified non-periodic portion appearing in the obtained image. It should be appreciated that, in various exemplary embodiments, the local datum may appear or occur within a periodic portion of the obtained image that is adjacent to the identified non-periodic portion. In contrast, in various other exemplary embodiments, the local datum appears within the identified non-periodic portion.

Next, in step S600, the obtained image is compared to a reference image to generate a correlation curve. It should be appreciated that, in various exemplary embodiments, the reference image is a synthetic image corresponding to the obtained image in a generic way. For example, a non-periodic portion appearing in the synthetic image could be either devoid of variation, or approximately representative of all of the non-periodic portions appearing on the scale, such that the difference between the synthetic non-periodic portion and each of the actual non-periodic portions is reduced as much as possible. In various other exemplary embodiments, the generic reference image could include only features corresponding to a periodic portion. It should be appreciated that any structure for the synthetic image that allows the correlation curve to be generated with sufficient accuracy can be used. In various other exemplary embodiments, an actual image obtained from the scale is used as the reference image. Then, in step S700, a third-resolution relative position between the readhead and the scale is determined based on the generated correlation curve. Operation then continues to step S800.

In step S800, the first-, second- and third-resolution relative positions between the readhead and the scale are combined to generate a high-resolution absolute measurement of the relative position between the readhead and the scale corresponding to the obtained image. Then, in step S900, the output position of the readhead relative to the scale that is determined based on the combined measurements is output. Operation then continues to step S1000, where operation of the method stops.

Figure 7:
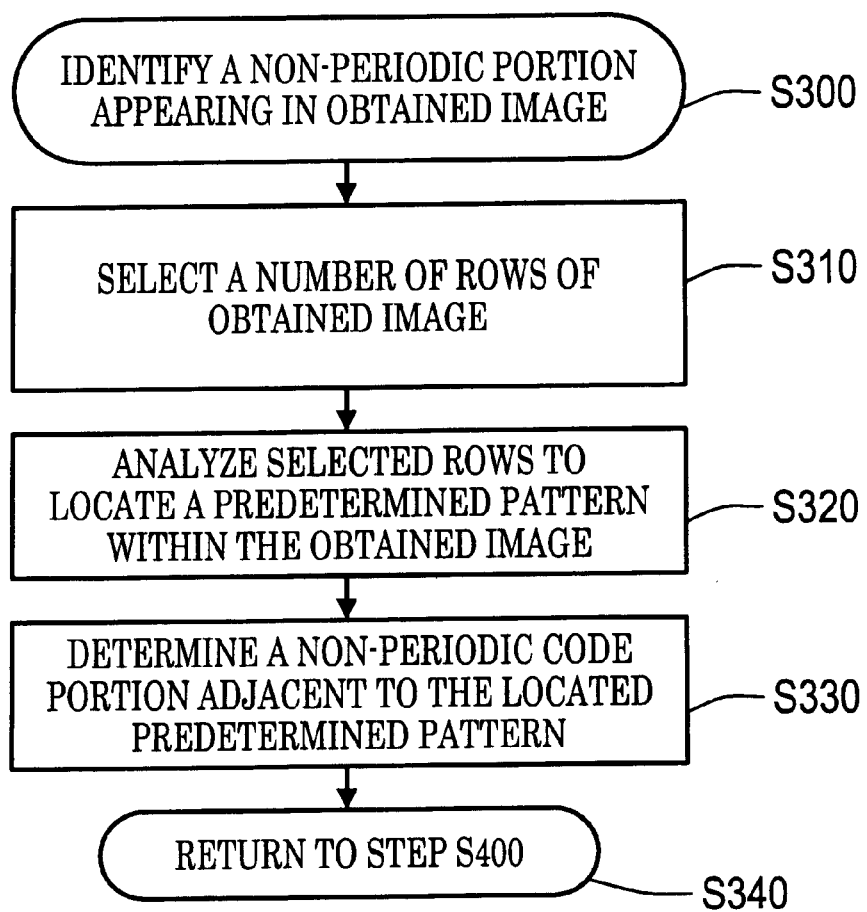
FIG. 7 is a flowchart outlining in greater detail one exemplary embodiment of a method for identifying and/or locating a non-periodic portion appearing in an obtained image according to this invention.

FIG. 7 is a flowchart outlining in greater detail one exemplary embodiment of the method for identifying a non-periodic portion appearing in the obtained image of step S300. As shown in FIG. 7, operation of the method begins in step S300, and continues to step S310, where a set of one or more rows extending along the measuring axis direction of the obtained image are selected for analysis. Of course, it should be appreciated that the selected set of rows could be all of the rows of the obtained image. Then, in step S320, the selected one or more rows are analyzed to identify a sequence of relatively light and dark pixels that that are known to correspond to the structure of a readily identifiable predetermined portion of the scale track formed on the scale. Next, in step S330, based on the identified location of the predetermined portion in the set of one or more selected rows of the obtained image, along with a priori knowledge of the position of the code information of the non-periodic portion relative to the identified predetermined portion, the image pixels corresponding to the non-periodic portion to be used in determining the relative position between the scale and the readhead are identified. Operation then continues to step S340, where operation of the method returns to step S400.

Figure 8:
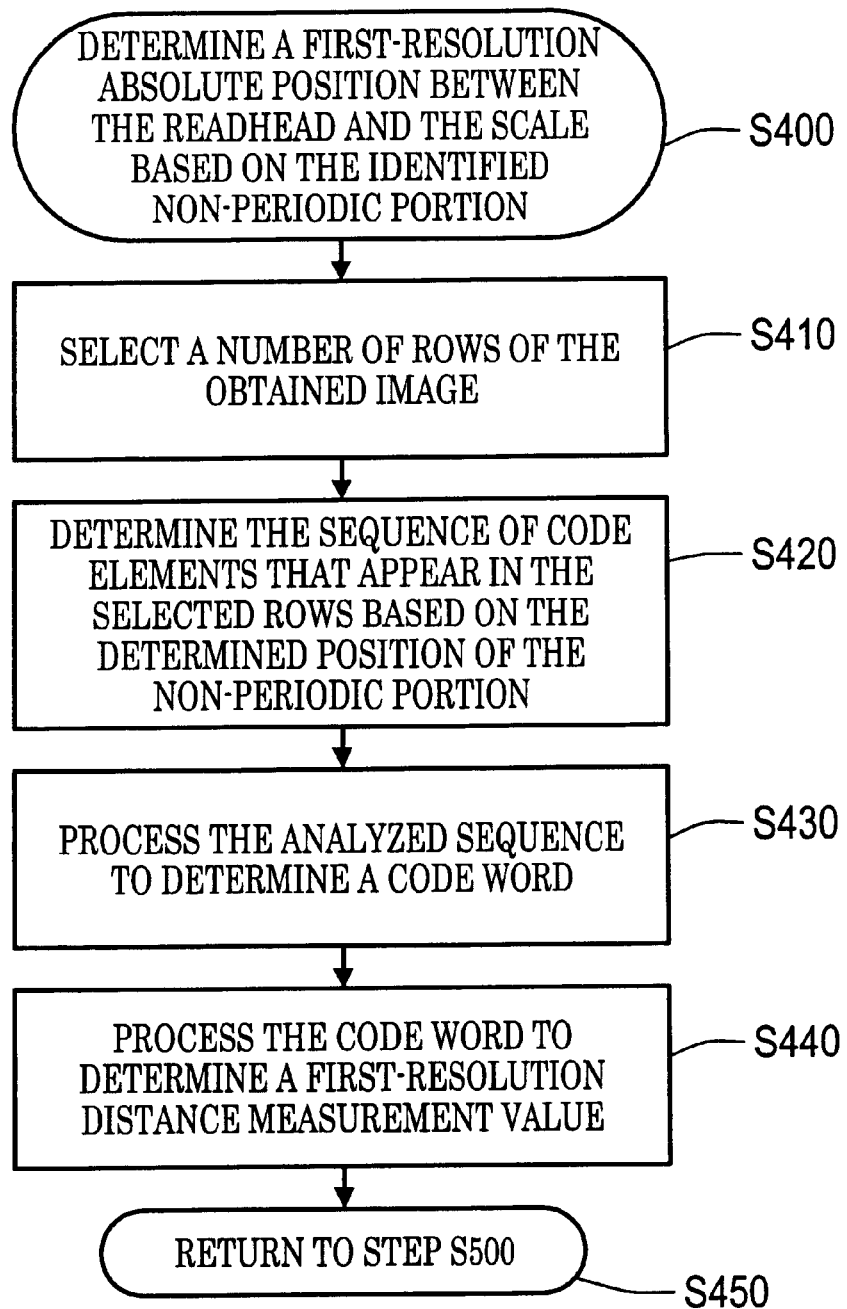
FIG. 8 is a flowchart outlining in greater detail one exemplary embodiment of a method for determining the absolute position of the readhead to the integrated absolute scale to a first resolution based on the code portion of the single-track absolute scale according to this invention.

FIG. 8 is a flowchart outlining in greater detail one exemplary embodiment for determining the absolute position of the readhead relative to the scale to the first resolution based on the identified non-periodic portion of step S400. As shown in FIG. 8, operation of the method begins in step S400, and continues to step S410, where a number of rows of the obtained image are selected. It should be appreciated that, in step S410, the selected number of rows can be the same set of rows selected and used in step S310. Alternatively, in various other exemplary embodiments, step S410 can be omitted if step S310 has already been performed, such that the same set of one or more selected rows as used in step S300 are used in step S400.

Then, in step S420, based on the identified position of the pixels of the non-periodic portion in the one or more selected rows, the sequence of code elements of that non-periodic portion that appear in the selected one or more rows of pixels is analyzed. In general, this comprises analyzing the sequence of the relatively light and dark pixels that occur within the selected one or more rows. Next, in step S430, the analyzed sequence of pixels corresponding to the code elements is processed to determine a code word that can be used to determine a measurement value. It should be appreciated that, in various exemplary embodiments, the coded scale markings define a binary code word where the dark pixels correspond to one of the binary values and the light pixels correspond to the other of the binary values. Of course, it should be appreciated that non-binary coding schemes, such as trinary or higher-ordered schemes, can be used. Operation then continues to step S440.

In step S440, the code word is converted into a first resolution distance measurement that indicates, to a first resolution, the portion and/or position of the scale in the obtained image, and thus the position of the scale relative to the readhead. It should be appreciated that, in various exemplary embodiments, the code word is converted into the first resolution distance measurement value using the code word as an input address to a lookup table. The output of the lookup table, based on the address indicated by the code word, indicates the corresponding first resolution distance measurement value. In contrast, in various other exemplary embodiments, the code word defines a number of first resolution periods do between an origin point on the scale and a current position of the readhead relative to the scale. Thus, the first resolution period do is multiplied by the value of the code word or number to obtain the first-resolution distance measurement value. In various other exemplary embodiments, the code word defines a number that is itself the first resolution distance measurement value. Operation then continues to step S450, where operation of the method returns to step S500.

It should be appreciated that, with respect to step S500, the second resolution relative position can be determined by determining the location of a local datum in the obtained image, relative to a reference position of the local datum which is implicit in the related signal processing operations. Any of the previously-described types of local datums may used.

Regardless of what feature or characteristic is used to define the local datum, in various exemplary embodiments, when the reference position for the local datum is the edge of the obtained image, the distance of the local datum to the edge of the obtained image is determined by counting the number of pixels between the feature defining the local datum and the edge of the obtained image. However, it should be appreciated that there is generally expected to be some uncertainty, on the order of a few pixels in the pixel position of the local datum feature and thus in the distance $d_1$ between the local datum feature and the edge of the obtained image.

Figure 9:
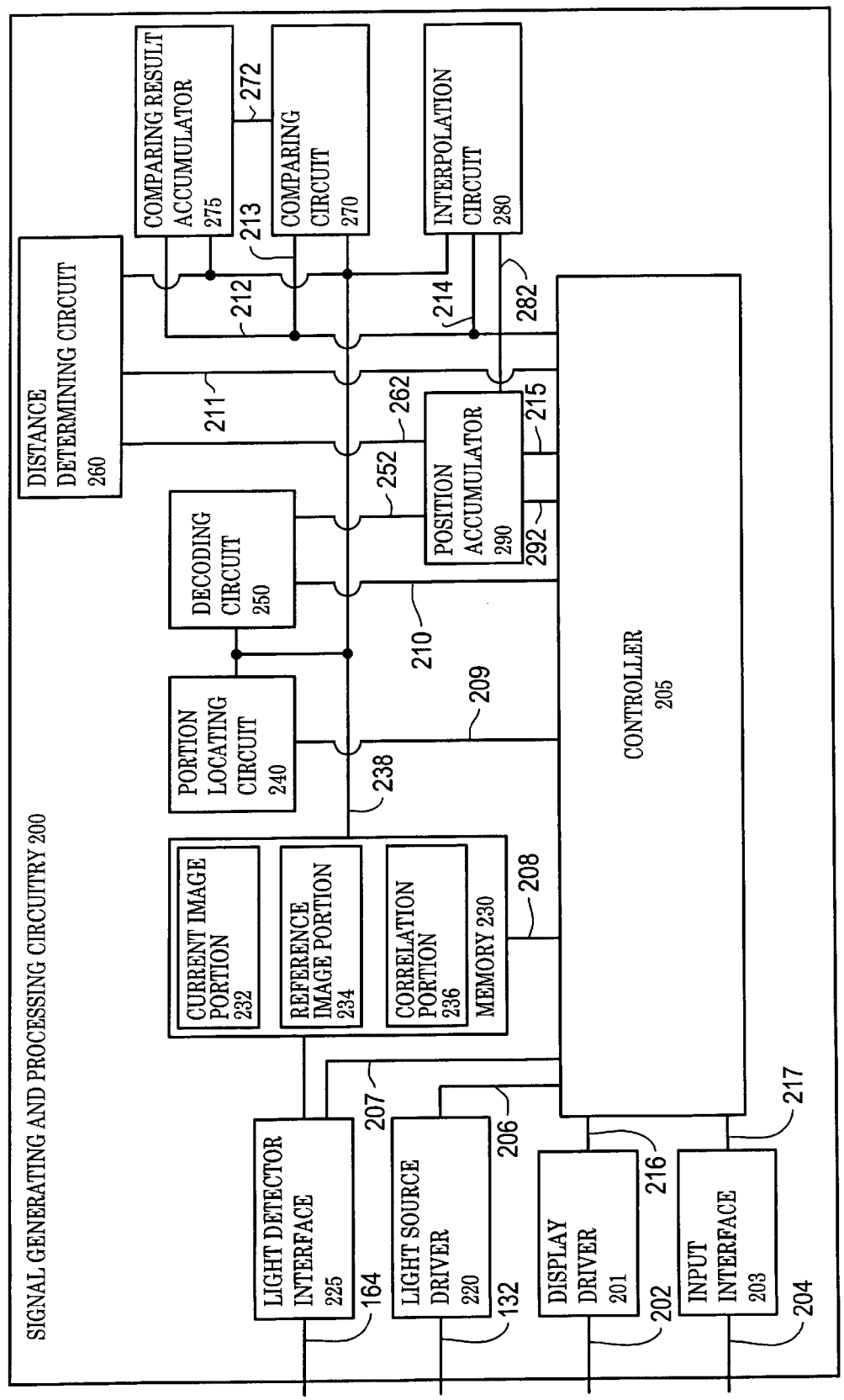
FIG. 9 is a block diagram outlining in greater detail one exemplary embodiment of the signal generating and processing circuitry of FIG. 1 usable to obtain an absolute position measurement from the integrated absolute scale according to this invention.

FIG. 9 is a block diagram outlining in greater detail one exemplary embodiment of the signal generating and processing circuitry 200 shown in FIG. 1. As shown in FIG. 9, the signal generating and processing circuitry 200 includes a controller 205, a light source driver 220, a light detector interface 225, a memory 230, a portion locating circuit 240, a decoding circuit 250, a distance determining circuit 260, a comparing circuit 270, a comparison result accumulation 275, an interpolation circuit 280, a position accumulator 290, a display driver 201 and an optional input interface 203.

The controller 205 is connected to the light source driver 220 by a signal line 206, to the light detector interface 225 by a signal line 207, and to the memory 230 by a signal line 208. Similarly, the controller 205 is connected by signal lines 209–215 to the portion locating circuit 240, the decoding circuit 250, the distance determining circuit 260, the comparing circuit 270, the comparison result accumulator 275, the interpolation circuit 280 and the position accumulator 290, respectively. Finally, the controller 205 is connected to the display driver 201 by a signal line 216 and, if provided, to the input interface 203 by a signal line 217. The memory 230 includes a current image portion 232, a reference image portion 234 and a correlation portion 236.

In operation, the controller 205 outputs a control signal over the signal line 206 to the light source driver 220. In response, the light source driver 220 outputs a drive signal to the light source 130 over the signal line 132. Subsequently, the controller 205 outputs a control signal to the light detector interface 225 and to the memory 230 over the signal lines 207 and 208 to store the signal portions received over the signal line 164 from the light detector 160 corresponding to each of the image elements 162 into the current image portion 232. In particular, the image values from the individual image elements 162 are stored in a two-dimensional array in the current image portion 232 corresponding to the positions of the individual image elements 162 in the array 166.

After the obtained or current image is stored in the current image portion 232, the current image is output over a signal line 238 to the portion locating circuit 240. Then, based on control signals output from the controller 205 over the signal lines 209, the portion locating circuit 240 analyzes one or more rows of the obtained image stored in the current image portion 232 to locate the predetermined portion 320 and/or the non-periodic portion 330. Then, based on control signals from the controller 205 over the signal line 210 the decoding circuit 250 inputs, from the current image portion 232 of the memory 230, the non-periodic portion, as located by the portion locating circuit 240, that appears within the obtained image. 101381 The decoding circuit 250 then converts the pattern of bright and dark pixels in the located portion of the obtained image into a code word and converts the code word into a first resolution distance measurement value using one of the various techniques outlined above. The decoding circuit 250 outputs this first resolution position measurement value to the position accumulator 290 over a signal line 252.

Next, based on the predetermined portion or non-periodic portion located by the portion locating circuit 240, the controller 205 outputs control signals over the signal line 211 to the distance determining circuit 260. In response, the distance determining circuit 260 inputs the all or part of the obtained image including at least the reference location for the local datum, such as one of the edges of the obtained image and the portion of the obtained image which is required in order to determine the location of the local datum from the current image portion 232 of the memory 230. The distance determining circuit 260 then analyzes this input portion of the obtained image to determine the second resolution distance measurement value for the relative position of the readhead relative to the scale based on the distance of the local datum to the reference position for the local datum. The distance determining circuit 260 outputs this second resolution distance measurement value over a signal line 262 to the position accumulator 290.

Then, the controller 205 outputs a signal on the signal line 209 to the comparing circuit 270. In response, the comparing circuit 270 inputs an image value for a particular pixel from the selected portion of the current image stored in the current image portion 232 over the signal line 238 and inputs the image value for the corresponding pixel, based on the current offset, from the reference image portion 234 over the signal line 238. The comparing circuit 270 then applies a correlation algorithm to determine a comparison result. Any appropriate correlation technique, known or later-developed, can be used by the comparing circuit 220 to compare the current image stored in the current image portion 232 with the reference image stored in the reference image portion 234 on a pixel-by-pixel basis based on the current offset. The comparing circuit 270 outputs the comparison result on a signal line 272 to the comparison result accumulator 275 for the current correlation offset.

Once the comparing circuit 270 has extracted and compared the image value for each of the image elements 162 from the current image portion 232 and compared them to the corresponding image value stored in the reference image portion 234, and applied the correlation technique and output the comparison result to the comparison result accumulator 275, the value stored in the comparison result accumulator 275 defines the correlation value, corresponding to the current offset, in predetermined units, as exemplified in FIG. 5. The controller 205 then outputs a signal over the signal line 213 to the comparison result accumulator 275 and to the memory 230 over the signal line 208. As a result, the correlation value result stored in the comparison result accumulator 275 is output and stored in the correlation portion 236 of the memory 230 at a location corresponding to the current offset.

The controller 205 then outputs a signal on the signal line 213 to clear the result accumulator 275. Once all of the comparisons for all of the desired offsets between the current image stored in the current image portion 232 and the reference image stored in the reference image portion 234 have been performed by the comparing circuit 270, and the results accumulated by the comparison result accumulator 275 and stored in the correlation portion 236 under control of the controller 205, the controller 205 outputs a control signal over the signal line 214 to the interpolation circuit 280.

The stored correlation curve stored in the correlation portion 236 of the memory 230 is then output, under control of the controller 205, to the interpolation circuit 280. That is, the interpolation circuit 280 inputs the correlation results stored in the correlation portion 236 over the signal line 238, and identifies correlation values coinciding with a peak or trough of the correlation function and interpolates using selected correlation function value points in the vicinity of the peak/trough of the correlation function to determine the peak offset value or image displacement value with sub-pixel resolution. The interpolation circuit 280 then outputs, under control of the signal over the signal line 214 from the controller 205, the determined subpixel third resolution measurement value on a signal line 282 to the position accumulator 290.

The interpolation circuit 280 first identifies a selected peak or trough of the correlation function to be used to identify the third resolution distance measurement value of the absolute position between the readhead and the scale. In various exemplary embodiments, where the initial correlation function is to be used by the interpolation circuit 280, the interpolation circuit 280 uses any known or later developed technique, such as any one of the techniques disclosed in the incorporated 671 patent to find the actual location of the selected peak of the correlation function to a subpixel resolution. This subpixel resolution distance is output by the interpolation circuit 280 over the signal line 282 to the position accumulator 290.

In contrast, in various other exemplary embodiments, once the interpolation circuit 280 has identified the selected peak or trough, the comparing circuit 270 and the comparison result accumulator 275 perform a full pixel-by-pixel comparison for the entire obtained and referenced images to generate a high-accuracy correlation curve, but only for the areas immediately surrounding the selected correlation curve peak or trough selected by the interpolation circuit 280. This additional correlation curve is also stored in the correlation portion 236. Then, under control of the controller 205, the interpolation circuit 280 inputs this second correlation curve and using any known or later developed interpolation technique, interpolates between the values of the correlation curve to identify the actual peak or trough offset of the selected peak or trough to the third resolution. Again, this third resolution distance measurement is output over the signal line 282 to the position accumulator 290.

The position accumulator 290 combines the distance measurement values output by each of the decoding circuit 250, the distance determining circuit 260 and interpolation circuit 280 to generate a high-resolution absolute position measurement indicative of the position of the readhead relative to the scale. The position accumulator 290 outputs this absolute position measurement to the controller 205 over the signal line 292. The controller 205 then outputs the determined absolute position measurement over a signal line 216 to a display driver 201. The display driver 201 drives a display (not shown) by outputting control signals over a signal line 202 to output the determined absolute position measurement.

In response, the controller 205 may output the updated displacement value to the display driver 201, if provided, over the signal line 217. The display driver 201 then outputs drive signals over the signal line 202 to the display device 107 to display the current displacement value.

One or more signal lines 204, if provided, allow an interface between an operator or a cooperating system and the controller 210. If provided, the input interface 203 may buffer or transform the input signals or commands and transmit the appropriate signal to the controller 205.

It should be appreciated that the foregoing discussion emphasizes scales 110 where each of the non-periodic portions 310 have a characteristic extent along the measuring axis direction 112 and each of the periodic portions 330 have a characteristic extent along the measuring axis direction 112. However, in various other embodiments, the extents may vary within one or more periodic portions 330 and/or one or more non-periodic portions 330. Nevertheless, in such cases, the code elements of each non-periodic portion 330 must still be indicative of a measurement value of a local datum, even though the local datums will not necessarily occur periodically along the scale.

It should also be appreciated that, in various applications, it is advantageous to combine an integrated scale track according to this invention and associated position detection methods with other types of scale tracks and their associated position detection methods. For example, incremental measurement systems using incremental scales having a very fine pitch on the order of a few micrometers or less are known to produce resolution and accuracy on the order of nanometers. It should also be appreciated that, when an integrated scale track and system according to this invention is appropriately combined with such a fine pitch incremental system, the integrated scale track and system can provide an absolute measurement accurate to within one particular period of the fine pitch incremental system.

The results of the two systems may therefore be combined to produce a combined absolute measurement system having the resolution and accuracy of the incorporated fine pitch incremental system. It should be further appreciated that, in such a combined scale track system with a fine pitch incremental scale track, the particular combination of high speed signal processing attributes, robustness for misalignments, resolution vs. range advantages and width advantages provided by this invention are of great utility.

It should also be appreciated that while various exemplary embodiments of the invention have been illustrated and described, a wide variety of alternative codes and detection schemes may be used for the non-periodic portions, and a wide variety of alternative hardware and software schemes are applicable to detect the location of the periodic portions relative to the readhead to provide the third-resolution measurement value according to the principles of this invention. Thus, it should be appreciated these and other various changes can be made to the various exemplary embodiments of the invention that have been illustrated and described herein without departing from the spirit and scope of the invention.

What is claimed is:

1. An absolute position sensing device usable to measure a relative position between two elements, the absolute position sensing device including a readhead and a scale, the scale including an integrated scale track extending along a measuring axis, the integrated scale track comprising:

a plurality of periodic portions placed within the integrated scale track along the measuring axis, each periodic portion comprising a plurality of N consecutive periodic scale elements along the measuring axis, where N is an integer greater than or equal to 3; and a plurality of non-periodic portions placed within the integrated scale track interleaved with the periodic portions along the measuring axis direction of the integrated scale track, each non-periodic portion comprising a plurality of code elements defining a code word that is usable to identify a measurement value of a local datum along the measuring axis;

wherein the plurality of periodic portions and the plurality of non-periodic portions are configured such that, along the measuring axis direction of the integrated scale track, a detection window of the readhead includes a number of code elements sufficient to define a code word usable to identify the measurement value of the local datum and further includes at least N−1 complete periodic scale elements, regardless of the position of the detection window along the measuring axis.

2. The absolute position sensing device of claim 1, wherein a length along the measuring axis of at least some of the code elements is narrower than a length of the periodic scale elements along the measuring axis.

3. The absolute position sensing device of claim 2, wherein N is greater than or equal to 5.

4. The absolute position sensing device of claim 2, wherein the length along the measuring axis of each of the code elements is narrower than one-half the length of the periodic scale elements along the measuring axis.

5. The absolute position sensing device of claim 2, wherein the length along the measuring axis of each of the code elements is narrower than one-third the length of the periodic scale elements along the measuring axis.

6. The absolute position sensing device of claim 1, wherein a predetermined portion of each of the plurality of non-periodic portions comprises a pattern that is the same for each of the plurality of non-periodic portions.

7. The absolute position sensing device of claim 1, wherein the percentage of the detection window area comprising the non-periodic portions is at most 50%, regardless of the position of the detection window along the measuring axis relative to the plurality of periodic portions and the plurality of non-periodic portions.

8. The absolute position sensing device of claim 7, wherein the percentage is at most 35%.

9. The absolute position sensing device of claim 1, wherein the readhead comprises a plurality of imaging elements extending in at least one row along a direction corresponding to the measuring axis direction, the extents of the detection window of the readhead corresponding to the extents of a projected image of the scale received by the plurality of imaging elements when the readhead is operably positioned relative to the scale.

10. The absolute position sensing device of claim 9, wherein the width of the detection window of the readhead in the direction perpendicular to the measuring axis is less than the width perpendicular to the measuring axis of the each of the periodic portions and the non-periodic portions.

11. The absolute position sensing device of claim 9, wherein the plurality of imaging elements have a pixel pitch along the at least one row and each code element has a length $L_c$ along the measuring axis such that the length $L_c$ times a readhead magnification of the projected image of the scale is at least 3 times the pixel pitch.

12. The absolute position sensing device of claim 11, wherein each periodic scale element has a length $L_p$ along the measuring axis such that the length $L_p$ times the readhead magnification of the projected image of the scale is at least 6 times the pixel pitch.

13. The absolute position sensing device of claim 1, wherein the integrated scale track comprises at least one diffusely reflecting surface.

14. The absolute position sensing device of claim 13, wherein:
the scale comprises a transparent substrate, the integrated-scale track provided on a surface of the substrate that is farthest from the readhead; and
the at least one diffusely reflecting surface comprises at least one portion of at least one diffuse backing provided on or over the integrated scale track.

15. The absolute position sensing device of claim 1, wherein at least one of a) at least some of the scale elements and the code elements, and b) spaces between the scale elements and the code elements, define diffusive surfaces.

16. The absolute position sensing device of claim 15, wherein:
the scale comprises a transparent substrate, the integrated scale track provided on a surface of the substrate that is farthest from the readhead; and
the diffusive surfaces are portions of a coating provided on or over the surface of the substrate that is farthest from the readhead.

17. An absolute position sensing device for measuring the relative position of two elements, the absolute position sensing device including a readhead and an absolute scale, the absolute scale including an integrated scale track extending along a measuring axis, the integrated scale track comprising:
a plurality of code groups usable to identify respective absolute measurement values along the scale, each code group having a plurality of individual code elements placed along the integrated scale track, each code element extending across substantially all of the integrated scale track in a direction perpendicular to the measuring axis; and
a plurality of incremental scale elements arranged to correspond to an underlying incremental pitch that is continuously periodic along the measuring axis for a distance spanning at least 3 code groups, each incremental scale element extending across substantially all of the integrated scale track in a direction perpendicular to the measuring axis;
wherein:
the plurality of incremental scale elements are interleaved between the code groups along the integrated scale track; and
at least some of the individual code elements have a width that is narrower in a direction along the measuring axis than the width of the incremental elements in the direction along the measuring axis.

18. The absolute position sensing device of claim 17, wherein:
the interleaved incremental scale elements are arranged in sub-pluralities in scale portions between the code groups; and
the length of the scale portions between the code groups along the measuring axis is greater than the length of the code groups along the measuring axis.

19. The absolute position sensing device of claim 18, wherein at least one of the scale portions between the code groups includes a maximum number of complete incremental scale elements that can be located within that respective scale portion according to the underlying incremental pitch.

20. The absolute position sensing device of claim 17, wherein:
the readhead comprises a light source and a detector array usable to detect an image of the scale; and
the pluralities of individual code elements and the plurality of incremental scale elements are arranged along the integrated scale track such that, when the readhead is operably positioned relative to the scale, the detected image of the scale includes, regardless of the readhead position along the integrated scale track:
a feature usable as a local datum point, and
a sufficient number of code elements to determine a measurement value of the local datum point.

21. The absolute position sensing device of claim 20, wherein the detected image is usable to determine a measurement value of an offset of the readhead relative to the local datum point.

22. The absolute position sensing device of claim 20, wherein:
the detector array comprises a plurality of detector elements arrayed according to a detector element pitch along a direction corresponding to the measuring axis;
the readhead further comprises at least one optical element, light from the scale passing through the at least one optical element such that the image of the scale detected by the detector array is magnified, thus imparting a readhead magnification to the detected image, and
each code element has a length $L_c$ along the measuring axis such that the length $L_c$ times the readhead magnification is at least 3 times the detector element pitch.

23. The absolute position sensing device of claim 17, wherein each code group includes a predetermined pattern and the predetermined pattern is the same for each of the plurality of code groups.

24. The absolute position sensing device of claim 17, wherein a plurality of sequential code groups along the scale comprises a plurality of sequential multi-bit numbers along the scale.

25. The absolute position sensing device of claim 24, wherein each sequential multi-bit number is directly usable to determine a measurement value of a local datum point without reference to a lookup table.

26. The absolute position sensing device of claim 17, further comprising a signal processing unit, wherein, when an operably positioned readhead detects an image of the scale, the signal processing unit is usable to determine a measurement value of a local datum based on one or more code groups included in the detected image.

27. The absolute position sensing device of claim 26, wherein the signal processing unit is further usable to determine a measurement value of an offset of the readhead relative to the local datum based at least partly on a plurality of incremental elements included in the detected image.

28. The absolute position sensing device of claim 27, wherein the signal processing unit is further usable to combine the measurement value of the local datum point and the measurement value of the offset of the readhead relative to the local datum point to determine a position measurement.

29. The absolute position sensing device of claim 17, wherein the integrated scale track comprises at least one diffusely reflecting surface.

30. The absolute position sensing device of claim 29, wherein:

the absolute scale comprises a transparent substrate, the integrated scale track provided on a surface of the substrate that is farthest from the readhead; and the at least one diffusely reflecting surface comprises at least one portion of at least one diffuse backing provided on or over the integrated scale track.

31. The absolute position sensing device of claim 17, wherein at least one of a) at least some of the scale elements and the code elements, and b) spaces between the scale elements and the code elements, define diffusive surfaces.

32. The absolute position sensing device of claim 31, wherein:

the scale comprises a transparent substrate, the integrated scale track provided on a surface of the substrate that is farthest from the readhead; and the diffusive surfaces are portions of a coating provided on or over the surface of the substrate that is farthest from the readhead.

33. A method for determining a high resolution position of a detector array along an absolute scale, wherein the absolute scale includes an integrated scale track extending along a measuring axis, the integrated scale track comprising:

a plurality of code groups usable to identify respective absolute measurement values along the scale, each code group having a plurality of individual code elements placed along the integrated scale track and each code element having an extent across the integrated scale track in a direction perpendicular to the measuring axis that is substantially greater than the extent of the code element in a direction along the measuring axis; and a plurality of incremental scale elements arranged to correspond to an underlying incremental pitch, wherein the plurality of incremental scale elements are interleaved between the code groups along the integrated scale track and each incremental scale element has an extent across the integrated scale track in a direction perpendicular to the measuring axis that is substantially greater than the extent of the incremental scale element in a direction along the measuring axis;

the method comprising:

detecting an image of a portion of the integrated scale track corresponding to a current position using the detector array;

determining a measurement value of a local datum based on at least one code group included in the detected image;

determining a measurement value of an offset of the detector array relative to the local datum based at least partly on a plurality of incremental scale elements included in the detected image; and combining the measurement value of the local datum point and the measurement value of the offset of the detector array relative to the local datum to determine the high resolution position of the detector array along the absolute scale.

34. The method of claim 33, wherein:

each code group includes a predetermined portion; and determining the measurement value of the local datum based on at least one code group comprises:

determining a location of the predetermined portion included in at least one of the at least one code group;

determining a location of the code elements in the detected image based on the determined location of the predetermined portion; and processing the detected image corresponding to the location of the code elements to determine code element values of the code elements appearing in the detected image; and determining the measurement value of the local datum based on the determined code element values.

35. The method of claim 33, wherein:

the detector array comprises a plurality of detector elements extending in at least one row along a direction corresponding to the measuring axis direction, the detector elements spaced apart according to a detector element pitch; and determining the measurement value of the offset of the detector array relative to the local datum comprises:

estimating an offset of a local datum characteristic relative to the detector array to a resolution that is finer in the detected image than a distance corresponding to one half of the underlying incremental pitch in the detected image, estimating an offset of a plurality incremental scale elements relative to the detector array to a resolution that is at least as fine in the detected image as the detector element pitch, and determining the measurement value of the offset of the detector array relative to the local datum based at least partly on the estimate of the offset of the local datum characteristic relative to the detector array and at least partly on the estimate of the offset of the plurality incremental scale elements relative to the detector array.

* * * * *